United States Patent
Plummer et al.

(10) Patent No.: US 10,891,213 B2
(45) Date of Patent: *Jan. 12, 2021

(54) CONVERTING BETWEEN A CARRIED THREAD AND A CARRIER THREAD FOR DEBUGGING THE CARRIED THREAD

(71) Applicant: Oracle International Corporation, Redwood Shores, CA (US)

(72) Inventors: Christopher J. Plummer, San Martin, CA (US); Serguei Vladimirovich Spitsyn, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/392,267

(22) Filed: Apr. 23, 2019

(65) Prior Publication Data

US 2020/0341884 A1 Oct. 29, 2020

(51) Int. Cl.
| | | |
|---|---|---|
| *G06F 11/36* | (2006.01) | |
| *G06F 9/48* | (2006.01) | |
| *G06F 9/54* | (2006.01) | |
| *G06F 9/38* | (2018.01) | |

(52) U.S. Cl.
CPC ........ *G06F 11/3624* (2013.01); *G06F 9/3802* (2013.01); *G06F 9/4843* (2013.01); *G06F 9/542* (2013.01)

(58) Field of Classification Search
None
See application file for complete search history.

(56) References Cited

U.S. PATENT DOCUMENTS

| | | | | |
|---|---|---|---|---|
| 9,268,666 | B2* | 2/2016 | Law | G06F 11/3644 |
| 2007/0101326 | A1* | 5/2007 | Cai | G06F 9/545 |
| | | | | 718/100 |
| 2008/0307419 | A1* | 12/2008 | Klein | G06F 9/4881 |
| | | | | 718/102 |
| 2010/0083275 | A1* | 4/2010 | Jayamohan | G06F 9/461 |
| | | | | 718/108 |
| 2010/0174946 | A1* | 7/2010 | Burdick | G06F 9/3851 |
| | | | | 714/38.14 |
| 2016/0011958 | A1* | 1/2016 | Smiljanic | G06F 11/36 |
| | | | | 717/134 |
| 2017/0285986 | A1* | 10/2017 | Gopal | G06F 12/0897 |
| 2017/0371552 | A1* | 12/2017 | Fan | G06Q 20/405 |
| 2018/0113789 | A1* | 4/2018 | Mola | G06F 11/3636 |

* cited by examiner

Primary Examiner — Daxin Wu
(74) Attorney, Agent, or Firm — Invoke

(57) ABSTRACT

Providing debugging support for a carried thread are disclosed. A debug agent converts between identifiers of carried threads and carrier threads. Further, a debug agent transfers debug configurations amongst multiple carrier threads associated with a same carried thread. With respect to identifier conversion, an agent receives, from a debuggee, a notification that an event occurred in association with a carrier thread. The agent determines that a carried thread is mounted on the carrier thread. The agent transmits, to the debugger, a notification that the event occurred in association with the carried thread.

30 Claims, 18 Drawing Sheets

Disable notifications that were enabled for the carrier thread based on the command for the single source code step to be executed on the carried thread
1126

CONVERTING BETWEEN A CARRIED THREAD AND A CARRIER THREAD FOR DEBUGGING THE CARRIED THREAD

RELATED CASE; INCORPORATION BY REFERENCE; DISCLAIMER

The following application is hereby incorporated by reference: Ser. No. 16/392,282 filed on Apr. 23, 2019. The Applicant hereby rescinds any disclaimer of claim scope in the related application or the prosecution history thereof and advises the USPTO that the claims in this application may be broader than any claim in the related application.

TECHNICAL FIELD

The present disclosure relates to threads of execution. In particular, the present disclosure relates to debugging support for a carried thread.

BACKGROUND

A compiler converts source code, which is written according to a specification directed to the convenience of the programmer, to machine or object code. Machine or object code is executable directly by the particular machine environment. Alternatively, a compiler converts source code to an intermediate representation (also referred to as "virtual machine code" or "virtual machine instructions" or "bytecode"). The virtual machine instructions are executable by a virtual machine that is capable of running on top of a variety of machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying machine environment (such as hardware) in which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
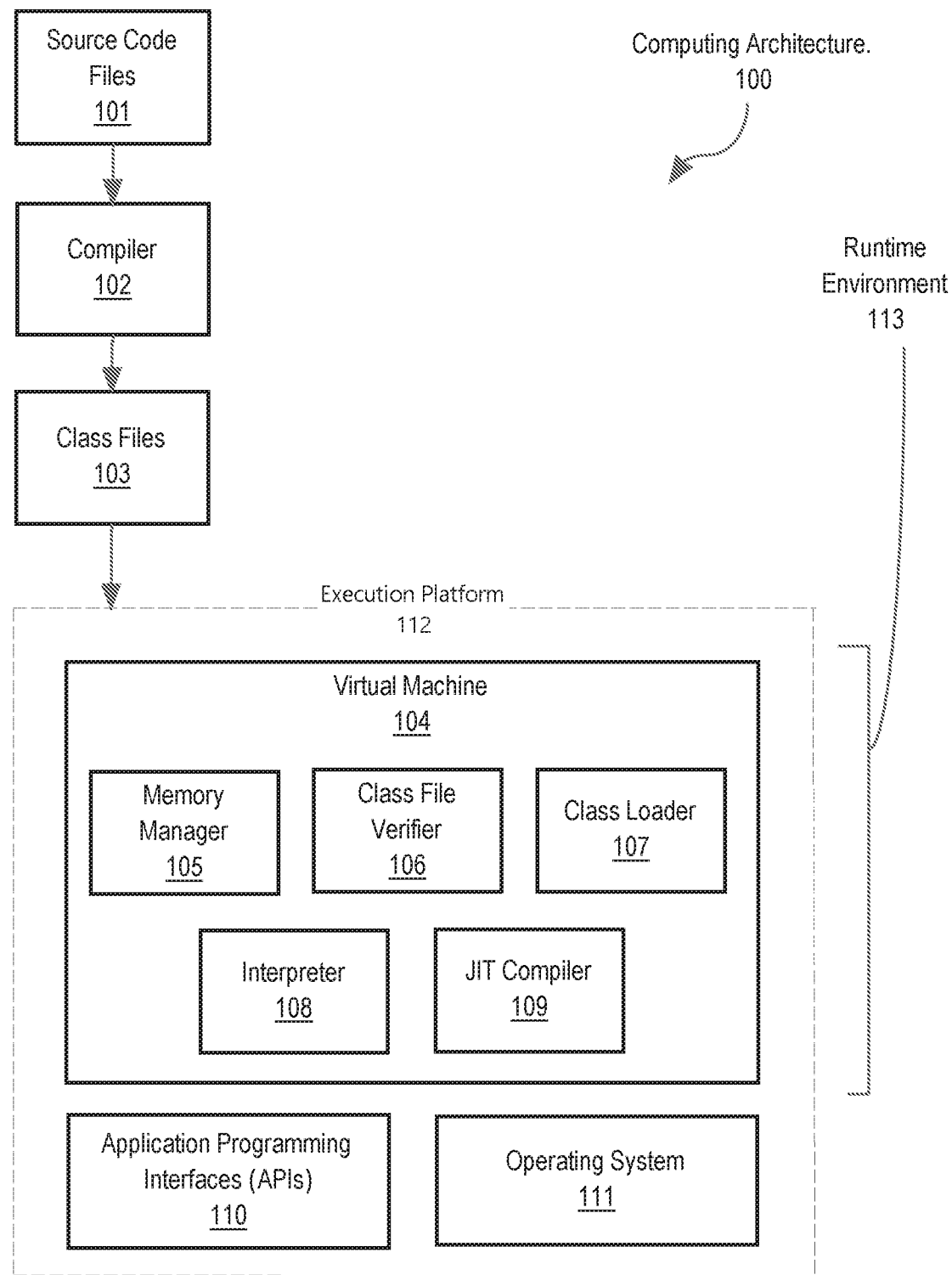
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. THREADS
4. DEBUGGING SYSTEM ARCHITECTURE
5. COMMUNICATING AN EVENT BETWEEN A TARGET APPLICATION AND A DEBUGGER
6. COMMUNICATING A COMMAND BETWEEN A TARGET APPLICATION AND A DEBUGGER
7. SETTING AND TRANSFERRING A CONFIGURATION ASSOCIATED WITH A CARRIED THREAD
8. MISCELLANEOUS; EXTENSIONS
9. HARDWARE OVERVIEW

1. General Overview

In one or more embodiments, a thread of execution (also referred to as a "thread") is a sequence of computer instructions that are executed sequentially. In a multi-threaded system, multiple threads share and execute on one or more carriers. Each thread is capable of being suspended and resumed. When a thread is suspended, the thread vacates the thread's carrier, thereby allowing another thread to execute on the carrier. When a thread is resumed, the thread's state from the last suspension is restored, thereby allowing continued execution of the thread.

There are at least two types of threads: kernel threads and user threads. Kernel threads are generated and managed by an operating system (OS). A kernel thread executes directly on a central processing unit (CPU) or processor (or a core of a multi-core processor). Hence a CPU (or core) may be referred to as a "carrier" for a kernel thread.

User threads are managed in user space. User libraries of a programming language provide a program developer with application programming interfaces (APIs) for creating and managing user threads. Since a kernel is not responsible for management of user threads, a user thread is executed on a kernel thread, or another user thread. A kernel thread may be referred to as a "carrier" or "carrier thread" for a user thread. A user thread on which another user thread is executing may be referred to as a "carrier" or "carrier thread" for the other user thread. Conversely, a user thread executing on a kernel thread or another user thread may be referred to as a "carried thread." Additionally, a user thread that is executing on a kernel thread or another user thread may be referred to as being "mounted on" the kernel thread or the other user thread.

The term "thread types" refers to different levels at which threads are mounted. As an example, a target program may include three thread types: (1) kernel threads; (2) a first level of user threads configured to be mounted on kernel threads and to have other user threads mounted thereon; and (3) a second level of user threads configured to be mounted on the first level of user threads.

One or more embodiments include providing debugging support to a carried thread of a target program. A debugging system involves: (a) a debuggee, which includes a target program and a virtual machine executing the target program; (b) a debug agent, which manages communications between the debuggee and a debugger; and (c) the debugger, which provides front-end access to a running state of the debuggee. The debug agent uses an interface to communicate with the debuggee. The debug agent uses an interface to communicate with the debugger. The subroutines, communications protocols, and/or standards for communicating with the debuggee, and the subroutines, communications protocols, and/or standards for communicating with the debugger, may be but are not necessarily different. The interface for communicating with the debuggee is configured for communicating certain events and/or commands with respect to certain thread types only. Additionally or alternatively, the interface for communicating with the debugger is configured for communicating certain events and/or commands with respect to certain thread types only. Any carried thread mounted on a thread of one of the certain thread types would be ignored in the communication. Hence, in order to provide debug support for a carried thread, a debug agent (also referred to as an "agent") performs at least the following operations: (a) converting between identifiers of carried threads and identifiers of carrier threads; and (b) transferring debug configurations amongst multiple carrier threads associated with a same carried thread.

One or more embodiments include converting between identifiers of carried threads and carrier threads for event notifications. An agent receives, from a debuggee, a notification that an event occurred in association with a carrier thread. The notification identifies the carrier thread, without identifying any carried thread that is mounted on the carrier thread. The agent determines that a carried thread is mounted on the carrier thread. The agent identifies the carried thread. The agent transmits, to a debugger, a notification that the event occurred in association with the carried thread. The notification identifies the carried thread, without necessarily identifying the carrier thread. Hence, even though the debuggee reported that an event occurred in association with a carrier thread, the agent reports to the debugger that the event occurred in association with a carried thread.

One or more embodiments include converting between identifiers of carried threads and carrier threads for action commands. An agent receives, from a debugger, a command for an action to be performed in association with a carried thread. The command identifies the carried thread, without identifying any carrier thread on which the carried thread is mounted. The agent determines that the carried thread is mounted on a carrier thread. The agent identifies the carrier thread. The agent transmits, to a debuggee, a command for the action to be performed in association with the carrier thread. The command identifies the carrier thread, without necessarily identifying the carried thread. Hence, even though the debugger commanded that an action be performed on a carried thread, the agent transmits a command for the action to be performed on a carrier thread.

One or more embodiments include providing selective notification of carried threads of a target program to a debugger. An agent receives, from a debuggee, a notification that an event occurred in association with a carrier thread. The agent determines that a carried thread is mounted on the carrier thread. The agent determines that the carried thread was not previously identified to a debugger. Responsive to (a) receiving the event in association with the carrier thread and (b) determining that the carried thread mounted on the carrier thread was not previously identified to the debugger, the agent transmits a notification, to the debugger, that indicates an existence of the carried thread. The notification may, for example, indicate that the carried thread was constructed, initiated, and/or started. Thereafter, the agent may transmit, to the debugger, a notification indicating that the event occurred in association with the carried thread. Hence, the agent need not overload the debugger with identification of all carried threads. The agent identifies to the debugger only carried threads on which an event has occurred and not every time a carried thread is created.

One or more embodiments include transferring debug configurations amongst multiple carrier threads associated with a same carried thread. An agent receives, from a debugger, a command for an action to be performed in association with a carried thread. The agent transmits a command to set an active debug configuration for a carrier thread on which the carried thread is mounted. Responsive to determining that the carried thread is unmounted from the carrier thread, the agent stores the active debug configuration for the carrier thread as a recorded debug configuration associated with the carried thread. The agent transmits a command to reset the active debug configuration on the carrier thread. The active debug configurations are reset on the carrier thread, irrespective of whether the action commanded by the debugger has been completed on the carried thread.

Responsive to determining that the carried thread is mounted on a carrier thread (which may be but is not necessarily the same as the previous carrier thread), the agent retrieves the recorded debug configuration associated with the carried thread. The agent restores the recorded debug configuration as an active debug configuration on the current carrier thread.

Hence, the agent ensures that a debug configuration associated with a carried thread is not enforced on a carrier thread after the carried thread is unmounted from the carrier thread. Additionally, the agent ensures that a debug configuration associated with a carried thread is consistently enforced for the carried thread as the carried thread is unmounted and mounted on a series of one or more carrier threads.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
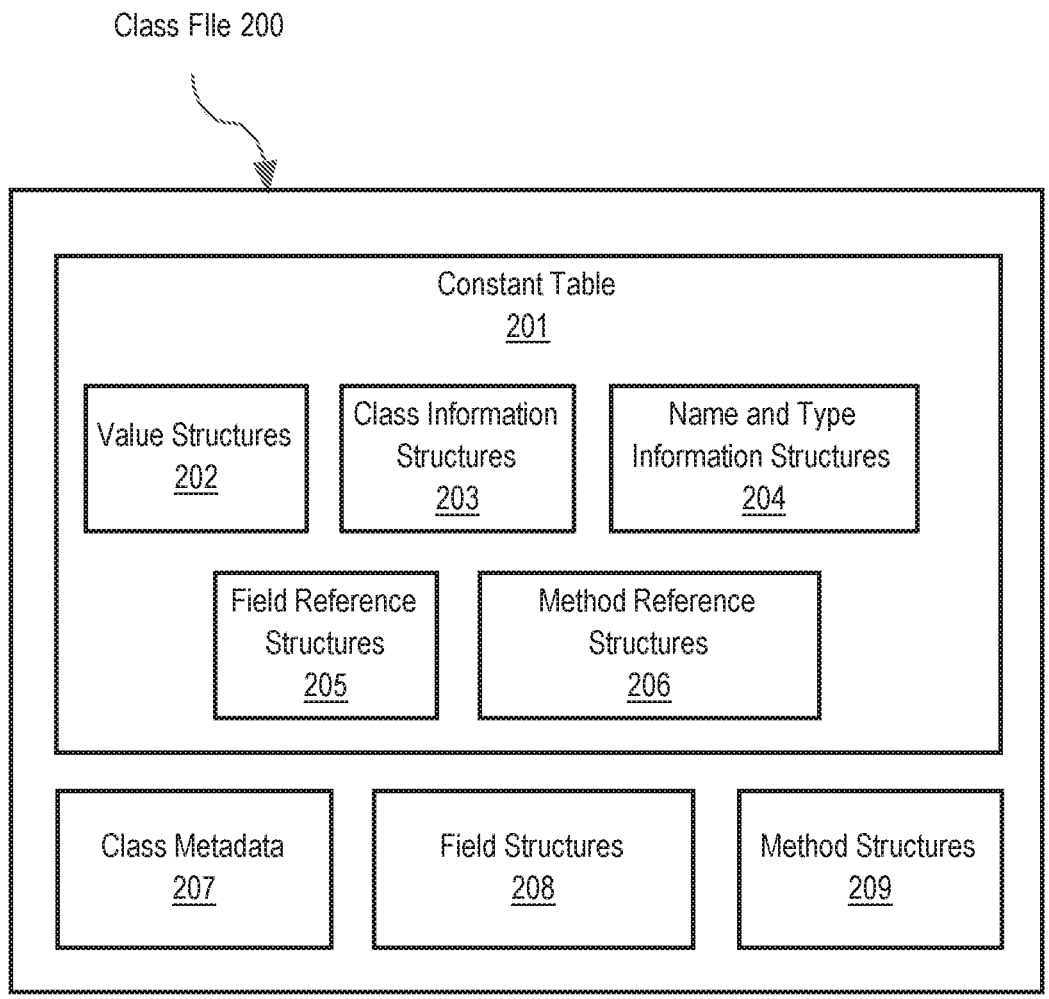
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field.

Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:
 class A
 {
 int add12and13 ( ) {
   return B.addTwo(12, 13);
 }
 }

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
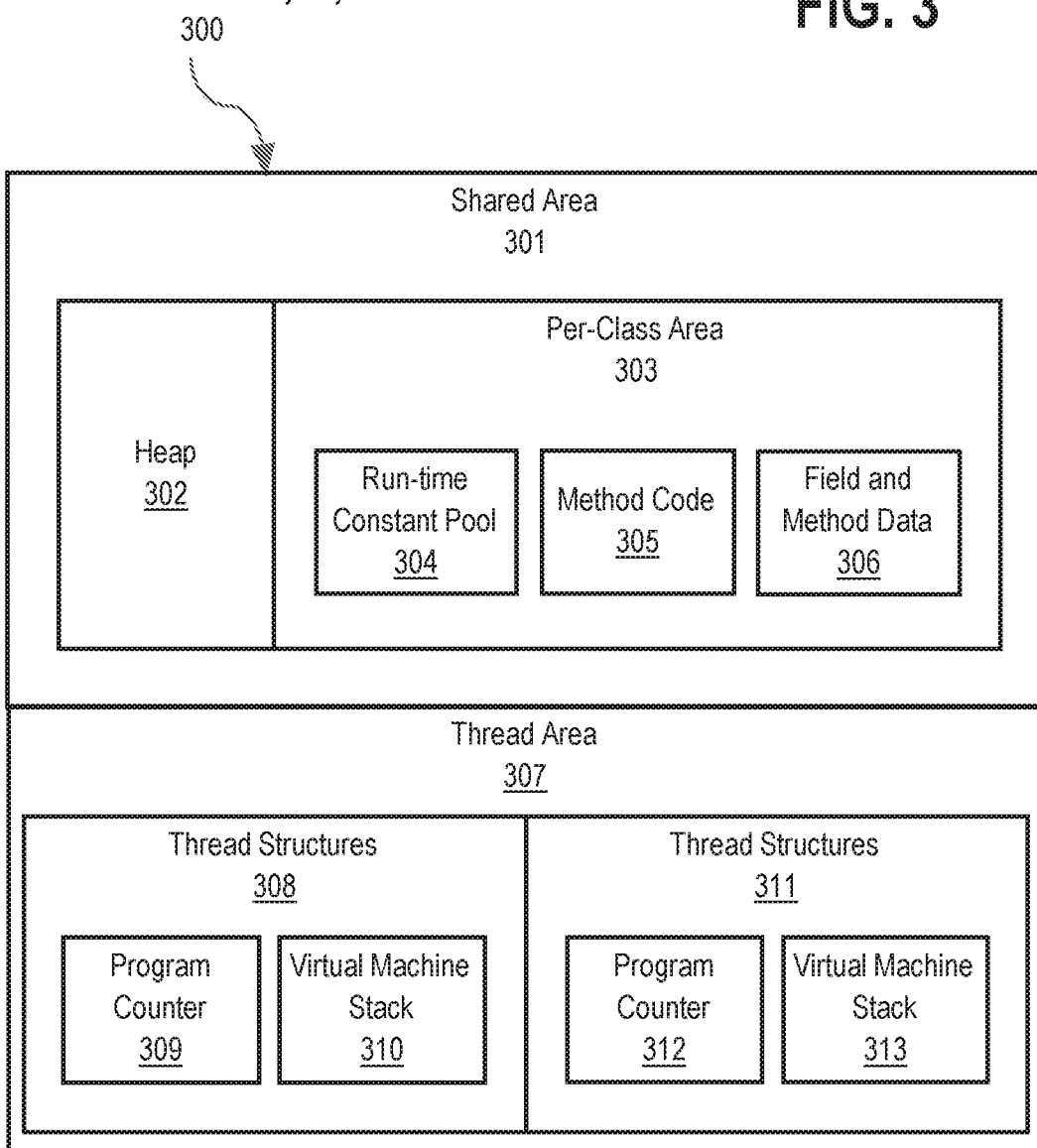
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
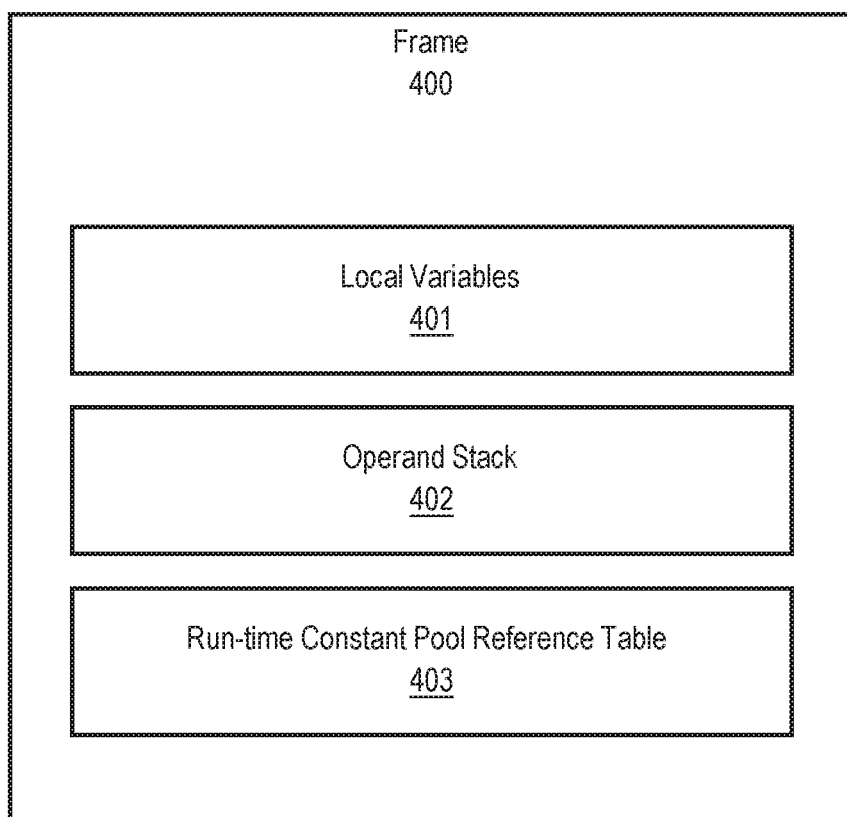
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Threads

Figure 5:
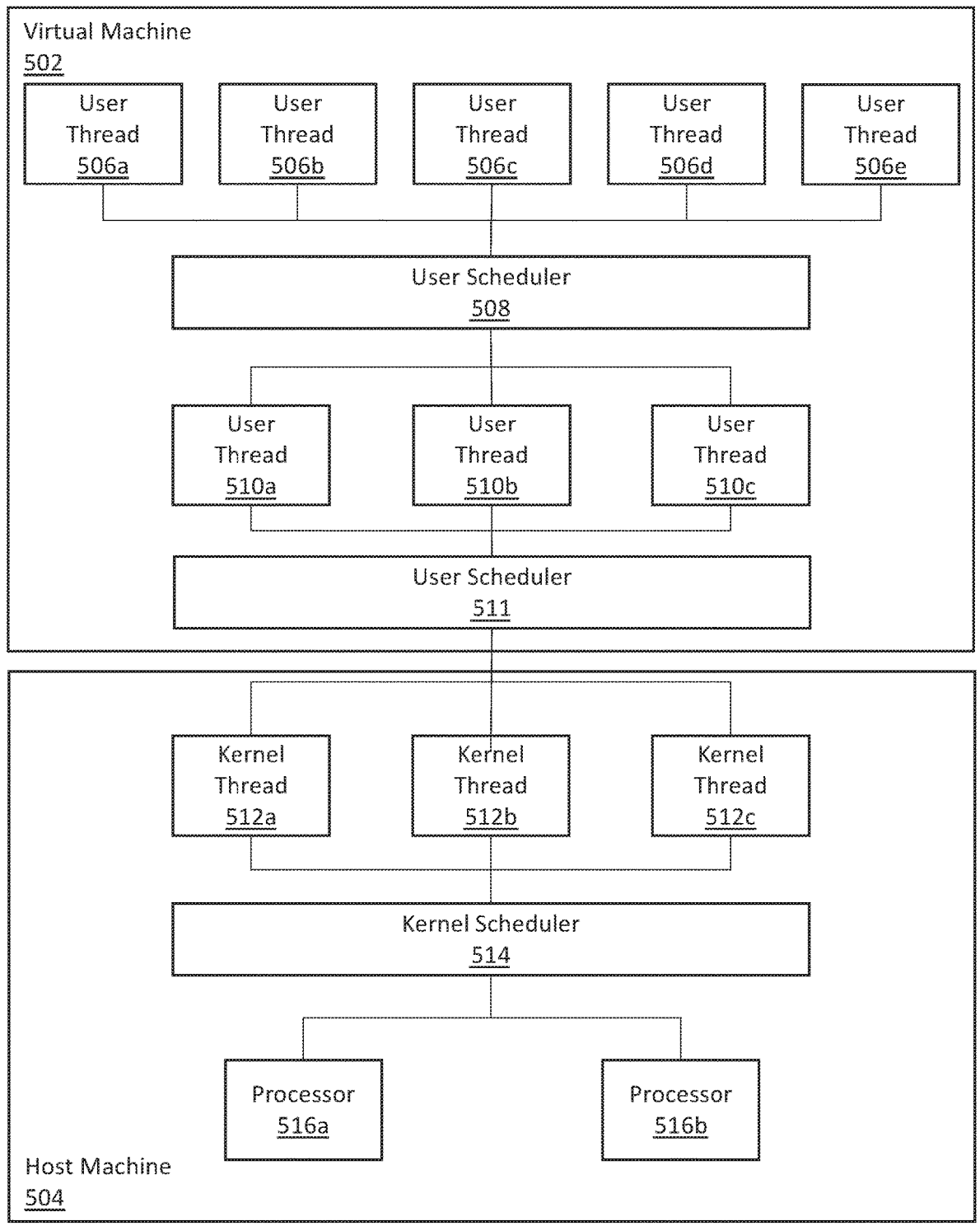
FIG. 5 illustrates user threads and kernel threads in an example system according to an embodiment.

FIG. 5 illustrates user threads and kernel threads in an example system according to an embodiment. A virtual machine 502 includes one or more user threads 506a-e, one or more user threads 510a-c, a user scheduler 508, and a user scheduler 511. A host machine 504 includes one or more kernel threads 512a-c, a kernel scheduler 514, and one or more processors 516a-b.

In one or more embodiments, a host machine 504 hosts a virtual machine 502. The host machine 504 is associated with one or more central processing units (CPU) or processors 516a-b.

In one or more embodiments, a thread (such as any of user threads 506a-e, user threads 510a-c, and kernel threads 512a-c) is a sequence of computer instructions that are executed sequentially. In a multi-threaded system, multiple threads share and execute on one or more carriers. Each thread is capable of being suspended and resumed. When a thread is suspended, the thread vacates the thread's carrier, thereby allowing another thread to execute on the carrier. When a thread is resumed, the thread's state from the last suspension is restored, thereby allowing continued execution of the thread.

In one or more embodiments, a kernel thread (such as any of kernel threads 512a-c) is generated and managed by an operating system (OS) of a host machine 504. A kernel thread executes directly on a processor (such as any of processors 516a-b). Additionally or alternatively, a kernel thread executes directly on a core of a multi-core processor. Hence a CPU (or core) may be referred to as a "carrier" for a kernel thread.

In one or more embodiments, a user thread (such as any of user threads 506a-e and user threads 510a-c) is managed in user space. One or more user libraries of a programming language provide a program developer with application programming interfaces (APIs) for creating and managing user threads. As an example, the java.lang.Thread class of the Java programming language provides constructors and functions (e.g., start ( ) and yield ( )) for user threads. Since a kernel is unaware of user threads, a user thread cannot execute directly on a processor (or core). Instead, a user thread is executed on a kernel thread, or another user thread. A kernel thread may be referred to as a "carrier" or "carrier thread" for a user thread. A user thread on which another user thread is executing may be referred to as a "carrier" or "carrier thread" for the other user thread. Conversely, a user thread executing on a kernel thread or another user thread may be referred to as a "carried thread." Additionally, a user thread that is executing on a kernel thread or another user thread may be referred to as being "mounted on" the kernel thread or the other user thread.

The term "thread types" refers to different levels at which threads are mounted. As an example, a target program may include three thread types: (1) kernel threads; (2) a first level of user threads configured to be mounted on kernel threads and to have other user threads mounted thereon; and (3) a second level of user threads configured to be mounted on the first level of user threads.

In one or more embodiments, a scheduler (such as any of user scheduler 508, user scheduler 511, and kernel scheduler 514) assigns threads to carriers, replacing a suspended thread with another thread that is ready to resume. The scheduler ensures that a thread that is ready to resume will eventually be assigned to a carrier.

In one or more embodiments, a kernel scheduler 514 is a scheduler that is managed by an OS. A kernel scheduler 514 may be used to schedule kernel threads and/or user threads. As illustrated, kernel scheduler 514 schedules kernel threads 512a-c to processors 516a-b.

In one or more embodiments, a user scheduler (such as any of user scheduler 508 and user scheduler 511) is a scheduler that is managed in user space. One or more user libraries of a programming language provide a program developer with APIs for creating and managing user schedulers. A user scheduler may be used to schedule kernel threads and/or user threads. As illustrated, user scheduler 511 schedules user threads 510a-c to kernel threads 512a-c. User scheduler 508 schedules user threads 506a-e to user threads 510a-c.

In one or more embodiments, a scheduler (such as any of user scheduler 508, user scheduler 511, and kernel scheduler 514) implements one of various multithreading models.

A many-to-many relationship model involves many user threads that are multiplexed by a smaller or equal number of kernel threads. As an example, under a many-to-many relationship model, a user scheduler 511 schedules any user thread to any kernel thread.

A many-to-one relationship model involves many user threads mapped to a single kernel thread. As an example, user threads 510a-b may be mapped to kernel thread 512a; and user thread 510c may be mapped to kernel thread 512b. A user scheduler 511 may schedule any of user threads 510a-b to kernel thread 512a. However, user thread 510c cannot be scheduled to kernel thread 512a.

A one-to-one relationship models involves a one-to-one mapping between user threads 510a-c to kernel threads 512a-c. As an example, user thread 510a may be mapped to kernel thread 512a; user thread 510b may be mapped to kernel thread 512b; and user thread 510c may be mapped to kernel thread 512c. In this case, the function of a user scheduler 511 is more akin to mapping, rather than scheduling.

In one or more embodiments, a carrier thread includes a reference to any carried thread that is mounted on the carrier thread. Conversely, a carried thread includes a reference to any carrier thread on which the carried thread is mounted. In one or more embodiments, each of a carrier thread and a carried thread is implemented as a respective object stored in a memory, such as a heap. The carrier thread object includes a reference to any carried thread object corresponding to any carried thread that is mounted on the carrier thread. Conversely, the carried thread object includes a reference to any carrier thread object corresponding to any carrier thread on which the carried thread is mounted.

Figure 6:
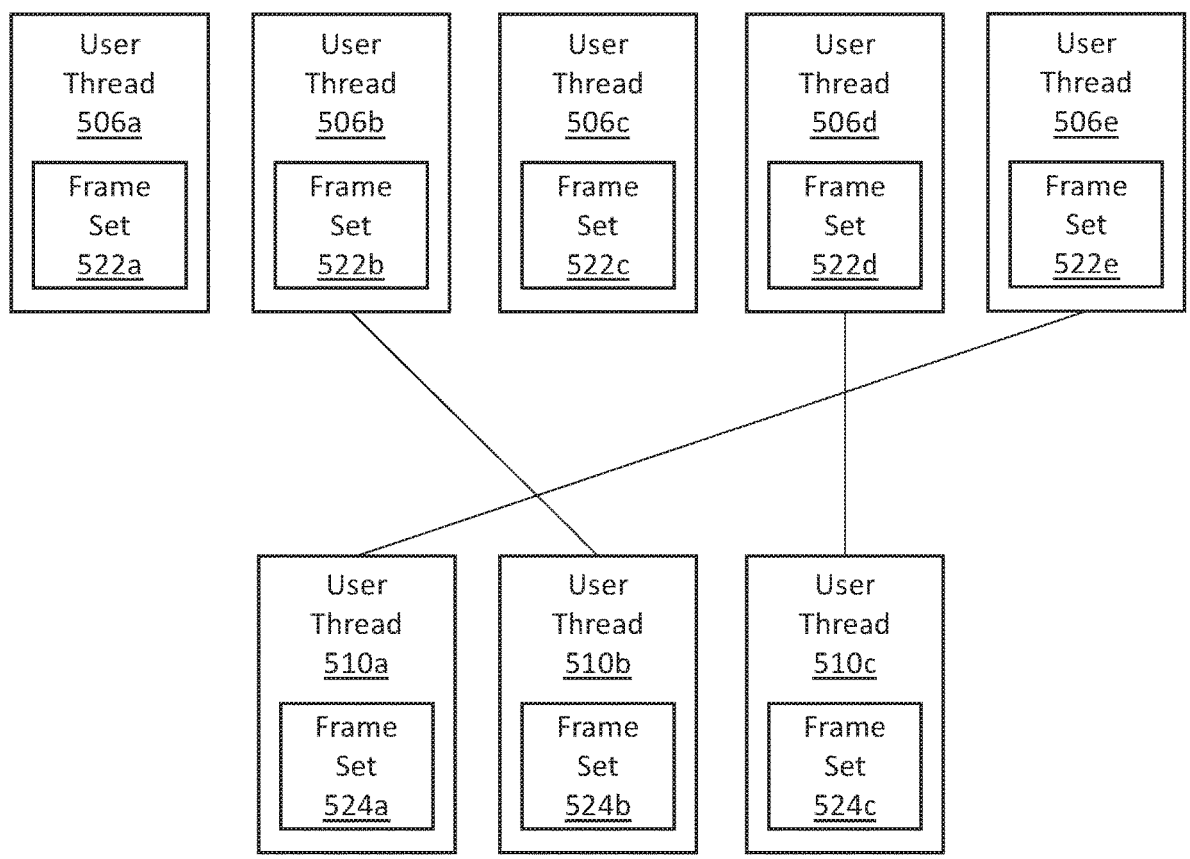
FIG. 6 illustrates a set of user threads mounted on another set of user threads according to an embodiment.

FIG. 6 illustrates a set of user threads mounted on another set of user threads according to an embodiment. Labels with the same numerals across FIGS. 5-6 refer to the same components.

User threads 506a-e are configured to be mounted on user threads 510a-c. Since user threads 506a-e are configured to be mounted on other threads, user threads 506a-c may be referred to as "carried threads." Since user threads 510a-c are configured to carry other threads, user threads 510a-c may be referred to as "carrier threads." There may be a many-to-many, many-to-one, or one-to-one relationship between user threads 506a-e and user threads 510a-c.

In a many-to-many relationship, any of user threads 506a-e may execute on any of user threads 510a-c. As illustrated, for example, user thread 506b is currently mounted on user thread 510b; user thread 506d is currently mounted on user thread 510a; and user thread 506e is currently mounted on user thread 510c. User thread 506a and user thread 506c are currently not mounted on any of user threads 510a-c. Thus user thread 506a and user thread 506c are currently not executing. User thread 506a and user thread 506c may be referred to herein as being "suspended." At a later point in time, any of user thread 506b, user thread 506d, and user thread 506e may become unmounted. Thereafter, any of user thread 506a and user thread 506c may be mounted onto any of user threads 510a-c that have been vacated.

In a many-to-one relationship, a respective subset of user threads 506a-e are mapped to each of user threads 510a-c. As an example, user threads 506a-b may share user thread 510a; user threads 506c-d may share user thread 510b; and user thread 506e may be mapped to user thread 510c. At one point in time, user thread 506a may be mounted on user thread 510a. Meanwhile, user thread 506b may be ready for execution. Even if user threads 506c-d are not ready for execution, hence leaving user thread 510b available, user thread 506b does not become mounted on user thread 510b. User thread 506b needs to wait for user thread 506a to vacate user thread 510a. User thread 506b may then be mounted on user thread 510a.

In a one-to-one relationship, user thread 506a may be mapped to user thread 510a; user thread 506b may be mapped to user thread 510b; user threads 506c may be mapped to user thread 510c; user threads 506d-e may be mapped to other user threads, respectively (not illustrated).

In one or more embodiments, each of user threads 510a-c ("carrier threads") is associated with a thread stack (also referred to a "call stack"). A thread stack is a stack data structure configured to store information associated with methods and/or routines called in a program. A thread stack includes one more stack frames (also referred to as "frames"). Each frame corresponds to a respective method called in a program. Each frame stores information such as a return address and local variables associated with the corresponding method. When a new method is called, a new frame is pushed onto a call stack. A return address for the new method is stored into the new frame. When execution of the method is complete, the corresponding frame is popped from the call stack. The return address is retrieved from the frame.

In one or more embodiments, each of user threads 506a-e ("carried threads") and user threads 510a-c ("carrier threads") is associated with a frame set. As illustrated, user thread 506a is associated with frame set 522a; user thread 506b is associated with frame set 522b; user thread 506c is associated with frame set 522c; user thread 506d is associated with frame set 522d; and user thread 506e is associated with frame set 522e. User thread 510a is associated with frame set 524a; user thread 510b is associated with frame set 524b; and user thread 510c is associated with frame set 524c.

A frame set is a set of frames corresponding to methods called during execution of the associated thread. For a carrier thread, a frame set of the carrier thread includes all frames on the carrier thread's thread stack.

Mounting a carried thread on a carrier thread involves effectively adding, or linking, the carried thread's frame set into the carrier thread's thread stack. Hence, the carried thread's frame set becomes part of the carrier thread's frame set. The carrier thread's frame set prior to mounting and the carried thread's frame set are effectively concatenated, or linked.

Unmounting a carried thread from a carrier thread involves removing the carried thread's frame set from the carrier thread's thread stack. The carried thread's frame set is removed from the carrier thread's thread stack and stored in memory. The carried thread's frame set is stored in memory to be restored when the carried thread is again mounted on a carrier thread. Meanwhile, the carrier thread's thread stack no longer includes any of the carried frame's frame set. The carrier thread's thread stack includes the carrier thread's frame set before the carried thread was mounted.

Hence, for a mounted carried thread, a frame set of the carried thread includes only a subset of frames on the carrier thread's thread stack. For an unmounted carried thread, a frame set of the carried thread includes frames that were previously on a carrier thread's thread stack and are currently stored in memory.

FIGS. 7A-E illustrate an example thread stack, of a carrier thread, during mounting and unmounting of carried threads, according to an embodiment.

Figure 7A:
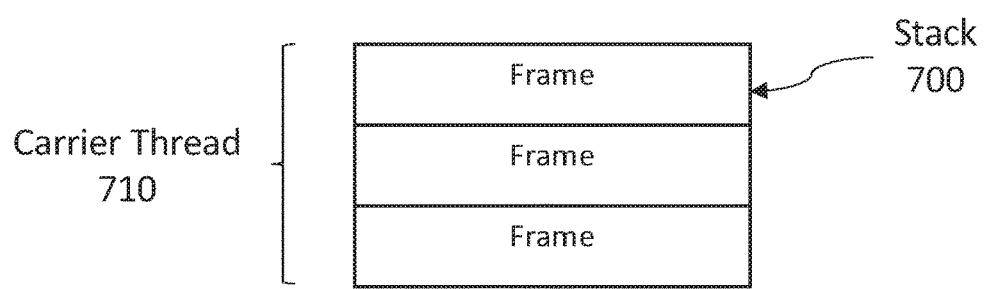
FIGS. 7A-E illustrate an example thread stack, of a carrier thread, during mounting and unmounting of carried threads according to an embodiment.

Referring to FIG. 7A, stack 700 is associated with carrier thread 710. Instructions of carrier thread 710 that have been executed have made calls to three methods. Hence, three frames associated with carrier thread 710 are currently pushed onto stack 700.

Figure 7B:
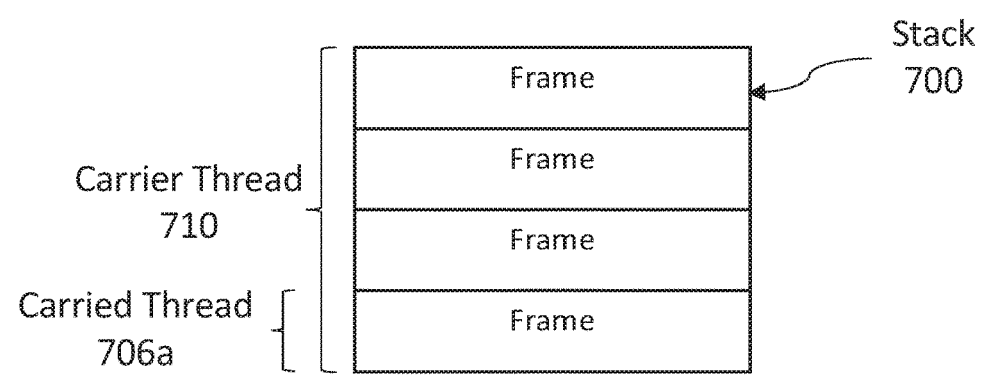

Referring to FIG. 7B, carried thread 706a is mounted on carrier thread 710. Instructions of carried thread 706a makes a first call to a method. Hence, one frame associated with carried thread 706a is pushed onto stack 700. Therefore, frames associated with carried thread 706a are effectively concatenated with the existing frames associated with carrier thread 710. Frames associated with carried thread 706a become part of a frame set of carrier thread 710. Assuming no unmounting occurs, when execution of carrier thread 706a is complete, the frames associated with carrier thread 706a are all popped. Control then returns to carrier thread 710.

Figure 7C:
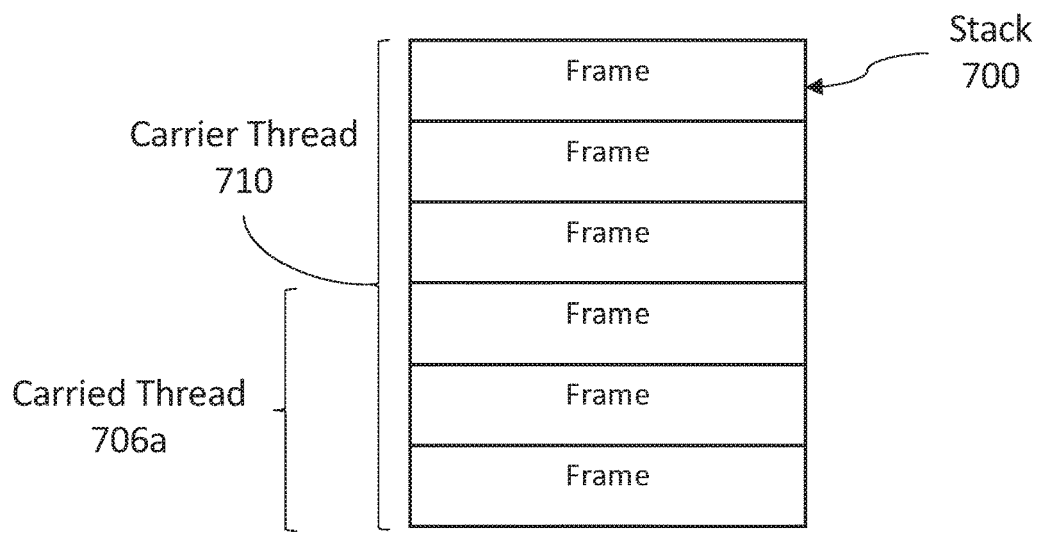

Referring to FIG. 7C, carried thread 706a continues execution. Instructions of carried thread 706a calls two more methods. Hence, a total of three frames associated with carried thread 706a have been pushed onto stack 700.

Figure 7D:
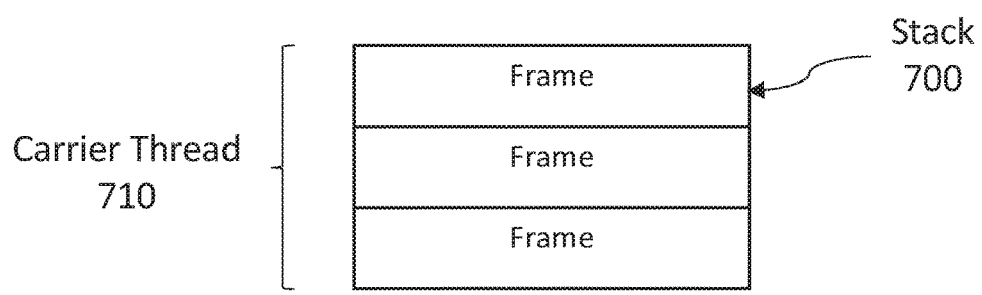

Referring to FIG. 7D, carried thread 706a is unmounted from carrier thread 710. During unmounting, all frames associated with carried thread 706a are removed from stack 700. Frames associated with carried thread 706a are stored so that the frames may be restored when carried thread 706a is again mounted. The frames associated with carried thread 706a may be stored in a data repository, such as a heap. Hence, the original three frames of carrier thread 710 now remain on stack 700. Unmounting requires only that frames associated with carried frame 706a be stored; frames associated with carrier thread 710 need not be stored.

Figure 7E:
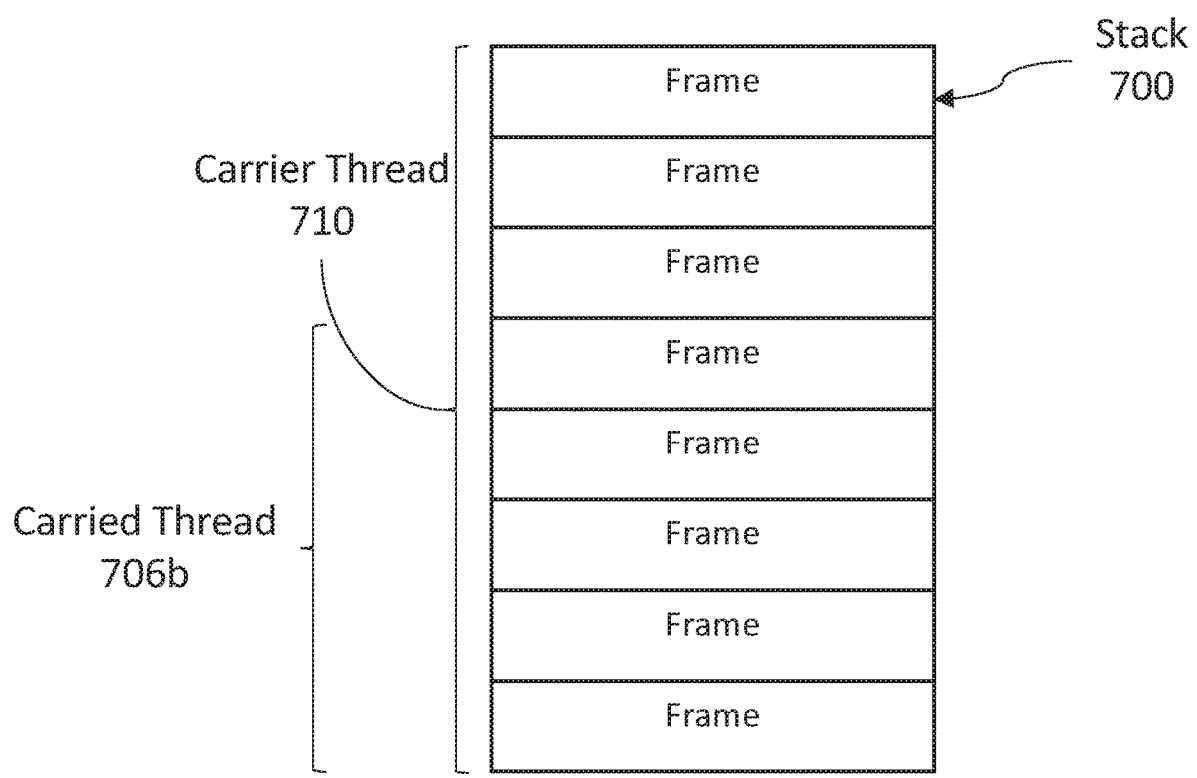

Referring to FIG. 7E, carried thread 706b (a different carried thread) may now be mounted on carrier thread 710. Carried thread 706b was previously mounted, executed, and unmounted. At the time of the prior unmounting, a frame set of carried thread 706b was removed from a carrier thread's thread stack. The frame set of carried thread 706b was stored in a data repository, such as a heap. The frame set included five frames, indicating that at least five methods had been called by instructions associated with carried thread 706b, and the five methods had not yet returned. Mounting carried thread 706b on carrier thread 710 includes retrieving the stored frame set from the data repository and mounting the stored frame set on stack 700. Hence, the five frames associated with carried thread 706b are effectively concatenated with the existing frames of carrier thread 710. Stack 700 now includes the five frames associated with carried thread 706b and the original three frames of carrier thread 710. Frames associated with carried thread 706b become part of a frame set of carrier thread 710.

Effectively concatenating frame sets of a carried thread and a carrier thread may be performed in additional or alternative ways. In an embodiment, unmounting a carried thread from a carrier thread includes storing the frame set of the carried thread in a data repository, such as a heap. Mounting the carried thread on a carrier thread includes copying frames from the stored frame set associated with the carried thread one at a time. The frames from the stored frame set are pushed one at a time onto the thread stack of the carrier thread. First, the last-added frame on the stored frame set associated with the carried thread is identified. The last-added frame on the stored frame set associated with the carried thread may be referred to as the "current carried thread frame." The current carried frame is pushed onto the thread stack of the carrier thread. The two last-pushed frames on the thread stack of the carrier thread now includes: (a) the current carried thread frame and (b) the last-pushed frame associated with a method called during execution of the carrier thread. A return barrier is installed between the two frames, such that when the method of the current carried thread frame exits, a next frame from the stored frame set is pushed onto the thread stack of the carrier thread. Frames from the stored frame set are thus pushed one by one onto the thread stack of the carrier thread until all frames of the stored frame set have been iterated. The method of copying frames of the carried thread one by one may be referred to as "lazy copying." "Lazy copying" effectively concatenates, or links, the frame set of the carried thread and the frame set of the carrier thread, because (a) the frames of the carried thread are executed according to the order in which the frames are stored in the frame set of the carried thread (based on the order in which the frames were pushed onto the thread stack of the previous carrier thread), and (b) after the last frame of the frame set of the carried thread exits, the frame to be processed next is the last-pushed frame associated with a method called during execution of the carrier thread, as stored on the thread stack of the carrier thread. Thereafter execution of the frame set of the carrier thread, based on the order in which the frames were pushed onto the thread stack of the carrier thread, continues.

In an embodiment, unmounting a carried thread from a carrier thread includes storing the frame set of the carried thread in a data repository, such as a heap. Mounting the carried thread on a carrier thread includes updating the program counter (pc) register such that the pc register directly references the memory location in the data repository where the frame set of the carried thread is stored. Hence, the pc counter references the memory location of the last-added frame on the stored frame set associated with the carried thread. When the method associated with the last-added frame exits, the pc counter is updated to reference the memory location of the next frame in the stored frame set. When all frames of the stored frame set are processed, the pc counter is updated to reference the last-pushed frame associated with a method called during execution of the carrier thread. The last-pushed frame associated with the carrier thread is stored on the thread stack of the carrier thread. The method of updating the pc register effectively concatenates, or links, the frame set of the carried thread and the frame set of the carrier thread, because (a) the frames of the carried thread are executed according to the order in which the frames are stored in the frame set of the carried thread (based on the order in which the frames were pushed onto the thread stack of the previous carrier thread), and (b) after the last frame of the frame set of the carried thread exits, the frame to be processed next is the last-pushed frame associated with a method called during execution of the carrier thread, as stored on the thread stack of the carrier thread. Thereafter execution of the frame set of the carrier thread, based on the order in which the frames were pushed onto the thread stack of the carrier thread, continues.

An "execution context" of a thread includes a set of data that is stored when the thread is suspended in order to allow the thread to resume at the same point of execution. An execution context of a carried thread includes only the frames associated with the carried thread (for example, the three frames associated with carried thread 706a); the execution context of a carried thread does not include frames associated with the carrier thread on which the carried thread is mounted. Meanwhile, an execution context of a carrier thread includes frames associated with the carrier thread as well as frames of any carried thread mounted on the carrier thread. An execution context of a carried thread generally includes a smaller set of data than an execution context of a carrier thread. A carried thread may be referred to as a "lightweight thread" in comparison to a carrier thread.

Mounting a carried thread on a carrier thread effectively means that a thread-local variable is accessible to both the carried thread and the carrier thread. Each thread of the same thread type is associated with the thread's own independent thread-local variables. As an example, one thread may be associated with a TransactionID thread-local variable; another thread of the same thread type may be associated with an independent TransactionID thread-local variable. Each thread accesses the thread's own TransactionID thread-local variable. However, where two threads are of different thread types, and one thread is mounted on the other thread, then the two threads access the same set of thread-local variables. As an example, a carried thread may be mounted on a carrier thread. The carried thread and the carried thread may access the same TransactionID thread-local variable. Meanwhile, another carrier thread may access an independent TransactionID thread-local variable.

4. Debugging System Architecture

Figure 8:
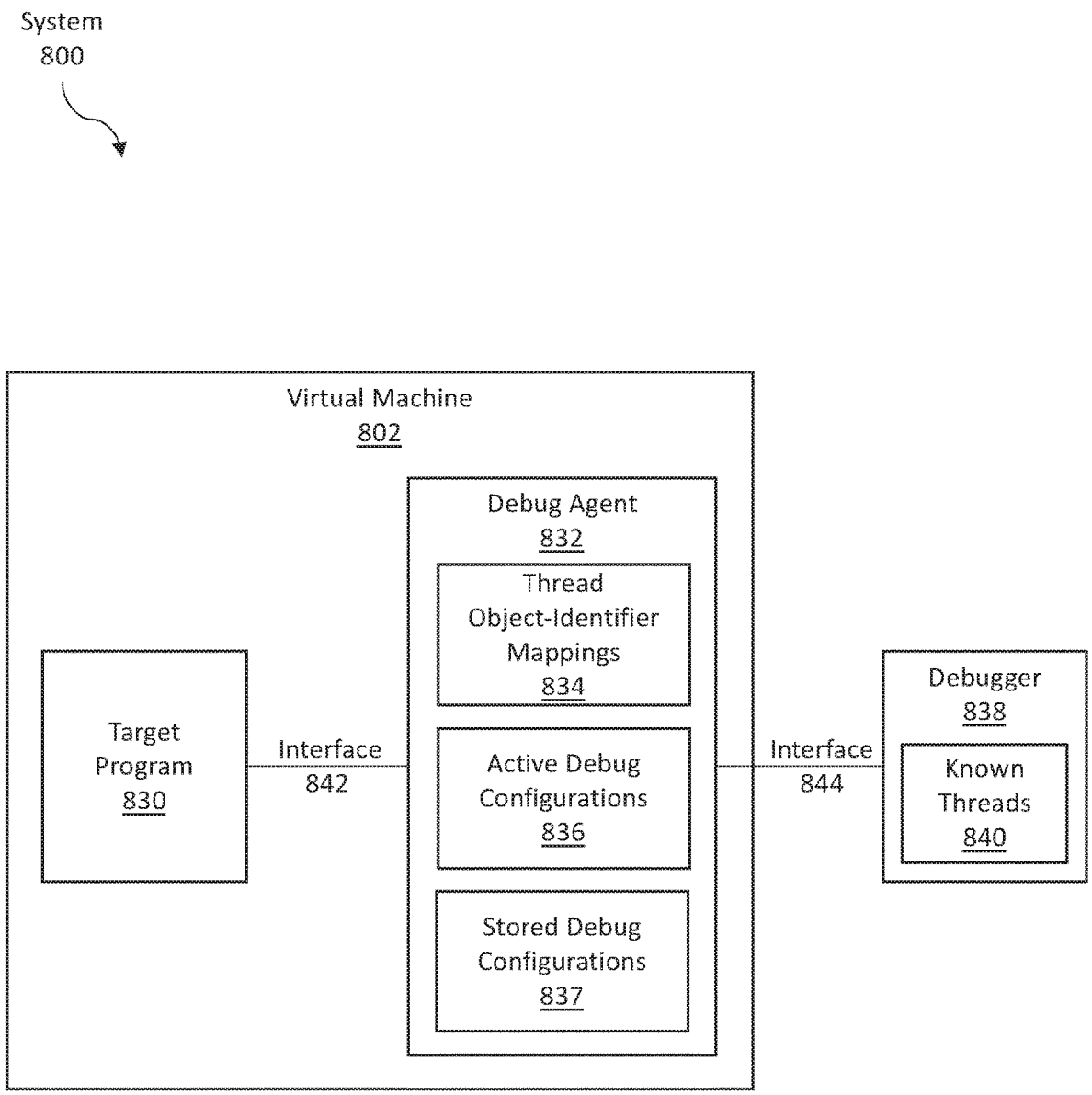
FIG. 8 illustrates an example debugging system according to an embodiment.

FIG. 8 illustrates an example debugging system according to an embodiment. As illustrated in FIG. 8, a system 800 includes a virtual machine 802, a target program 830, a debug agent 832, and a debugger 838. In one or more embodiments, the system 800 may include more or fewer components than the components illustrated in FIG. 8. The components illustrated in FIG. 8 may be local to or remote from each other. The components illustrated in FIG. 8 may be implemented in software and/or hardware. Each component may be distributed over multiple applications and/or machines. Multiple components may be combined into one application and/or machine. Operations described with respect to one component may instead be performed by another component.

In one or more embodiments, a target program 830 is a program to be debugged. Debugging target program 830 may include monitoring the target program 830, receiving event notifications from the target program 830, and/or performing debug actions on the target program 830. As described above with reference to FIGS. 5-7, a target program 830 may include one or more carrier threads and/or one or more carried threads. A target program 830 and a virtual machine 802 executing the target program 830 may be referred to as a "debuggee."

In one or more embodiments, a debug agent 832 refers to software and/or hardware configured to perform two-way communications with a debuggee, and to perform two-way communications with a debugger 838. One or more debug agents 832 may be associated with a single debuggee.

A debug agent 832 may receive an event notification from a debuggee. The debug agent 832 may forward the event notification to a debugger 838. An event notification indicates that a certain event occurred in response to execution of a particular instruction. If an event notification indicates that an event occurred on a particular thread, then the event notification indicates that the event occurred in response to execution of an instruction of the particular thread. Examples of events include a single step event, a breakpoint event, and a frame pop event. When single step event notifications are enabled, a single step notification is generated after execution of each single step of virtual machine instructions. When breakpoint event notifications are enabled, a breakpoint notification is generated whenever a thread reaches a location, in a set of virtual machine instructions, designated as a breakpoint. The breakpoint designation may have been made through a debugger. When a frame pop event notification is enabled, a frame pop notification is generated upon exit from a method in a previously-specified frame (that is, when the specified frame is popped from the thread stack). An exit from a method in a particular frame occurs when termination is caused by executing the method's return instruction, or by throwing an exception to the method's caller.

Additionally or alternatively, the debug agent 842 may query and control the debuggee through performing debug actions. The debug actions may be but are not necessarily performed in response to events. The debug actions may be requested and/or commanded through a debugger. Examples of debug actions include single stepping a source code line, and single stepping a bytecode.

In an embodiment, a debug agent 832 uses a programming interface 842 (and/or protocol) to communicate with a debuggee. For example, an interface for communications between a debug agent 832 and a debuggee is the Java Virtual Machine Tools Interface (JVM TI). JVM TI is a native interface implemented by a virtual machine 802. JVM TI defines required services and/or optional services that the virtual machine 802 may provide for debugging.

In an embodiment, a debug agent 832 uses a programming interface 844 (and/or protocol) to communicate with a debugger 838. For example, a protocol for communications between a debug agent 832 and a debugger 838 is the Java Debug Wire Protocol (JDWP). JDWP defines the format of information and requests transferred between a debuggee and a debugger 838. JDWP does not necessarily define any transport mechanism (such as, socket, serial line, shared memory) for communications between a debuggee and a debugger 838.

In an embodiment, the interface 842 and the interface 844 identify a thread in different ways. In the interface 842 between a debug agent 832 and a debuggee, a thread is identified through using a reference to a thread object representing the thread. The thread object is stored in a memory (such as a heap) of a virtual machine 802. In the interface 844 between the debug agent 832 and a debugger 838, a thread is identified through using a thread identifier (ID). In alternative embodiments, other types of identifiers may be used. As an example, an interface 842 between a debug agent 832 and a debuggee may use one system of thread IDs (which are not necessarily references to thread objects). An interface 844 between the debug agent 832 and a debugger 838 may use another system of thread IDs.

In an embodiment, the interface 842 and the interface 844 are configured for communicating certain events and/or commands with respect to certain thread types only. The interface 842 and the interface 844 may be used to indicate an event and/or command in association with threads of the certain thread types. However, any carried thread mounted on the threads of the certain thread types would be ignored in the communication. Referring to FIG. 5, for example, an interface between an agent and a debuggee may be used to transmit events and/or commands with respect to user threads 510a-c, not user threads 506a-e. An interface between an agent and a debugger may be used to transmit events and/or commands with respect to user threads 510a-c, not user threads 506a-e.

Hence, in order to provide debug support for a carried thread, a debug agent 832 performs at least the following operations: (a) converting between thread identifiers (IDs) of carried threads and thread IDs of carrier threads; and (b) transferring debug configurations amongst multiple carrier threads associated with a same carried thread. Examples of operations for communicating events and commands associated with a carried thread using thread ID conversion are described below with reference to FIG. 10 and FIGS. 11A-C. Examples of operations for setting and transferring a debug configuration for a carried thread are described below with reference to FIGS. 12-13.

In one or more embodiments, a debug agent 832 manages a set of thread object-identifier mappings 834. A set of thread object-identifier mappings 834 may include a mapping between (a) a reference to a carrier thread object representing a carrier thread and (b) a thread ID of the carrier thread. Additionally or alternatively, the set of thread object-identifier mappings 834 include a mapping between (a) a reference to carried thread object representing a carried thread and (b) a thread ID of the carried thread. Since the interface 842 and the interface 844 identify a thread in different ways, the set of thread object-identifier mappings 834 facilitates communications between the interface 842 and the interface 844. In alternative embodiments, a debug agent 832 manages a set of mappings between (a) a system of thread IDs used by an interface 842 and (b) a different system of thread IDs used by an interface 844. A thread ID of one system referring to a particular thread is mapped to a thread ID of the other system referring to the same particular thread.

In one or more embodiments, a debug agent 832 is associated with a set of active debug configurations 836. Active debug configurations 836 are "active" because active debug configurations 836 are enforced as a target program 830 is executed. Active debug configurations 836 indicate which event notifications are enabled and which event notifications are disabled. Events, on a particular thread, corresponding to a particular event notification are generated only if the particular event notification has been enabled for the particular thread (or globally). Enabling or disabling an event notification may be referred to as a "debug action." Additionally, setting, modifying, or removing a debug configuration may be referred to as a "debug action."

Active debug configurations 836 may indicate which event notifications are enabled or disabled per individual thread or on a global basis. However, since active debug configurations 836 are communicated to the debuggee, and communications between the debuggee and the agent 832 account for only certain thread types, active debug configurations 836 may be set only with respect to threads of the certain thread types. Active debug configurations 836 cannot by set with respect to any carried threads mounted on the threads of the certain thread types. Referring to FIG. 5, for example, active debug configurations may be set only with respect to user threads 510*a-c*, not user threads 506*a-e*.

In one or more embodiments, a debug agent 832 is associated with a set of recorded debug configurations 837. Recorded debug configurations 837 are "recorded" because recorded debug configurations 837 are merely stored for possible later use; recorded debug configurations 837 are not enforced as a target program 830 is executed. Recorded debug configurations 837 may indicate enabled or disabled event notifications of carried threads, for which active debug configurations 836 cannot be set. When a carried thread is unmounted from a carrier thread, active debug configurations 836 for the carrier thread are identified and stored as recorded debug configurations 837 in association with the carried thread. When the carried thread is remounted onto a carrier thread (which may be the same as or different from the previous carrier thread), the recorded debug configurations 837 for the carried thread are retrieved and restored as active debug configurations 836 on the current carrier thread.

In an embodiment, information describing thread object-identifier mappings 834, active debug configurations 836, and recorded debug configurations 837 may be implemented in a data repository associated with a debug agent 832. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as a debug agent. Alternatively or additionally, a data repository may be implemented or executed on a computing system separate from a debug agent. The data repository may be communicatively coupled to the debug agent via a direct connection or via a network.

In an embodiment, a debug agent 832 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, a debugger 838 refers to software and/or hardware configured to provide front-end access to a running state of the debuggee. A debugger 838 may use a high-level interface, such as the Java Debug Interface (JDI), to present and/or receive information via a user interface. As an example, a programmer may designate a breakpoint using a debugger. As another example, a programmer may command enablement of a single step event notification using a debugger. As another example, a programmer may inspect the values of variables in a running state of a target program using a debugger.

A user interface refers to hardware and/or software configured to facilitate communications between the debugger 838 and a user (such as a programmer). The user interface renders user interface elements for presenting information and receiving user input. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, a debugger 838 maintains a set of known threads 840. Each time a debugger 838 is notified that a thread has been constructed, initiated, and/or started, the debugger 838 stores a thread ID of the thread into a set of known threads 830. The debugger 838 processes events only for threads that the debugger 838 is aware of.

A set of known threads 840 may be continuously updated. New threads identified to the debugger 838 may be added to the set of known threads 840. Threads for which no new events have occurred within a threshold time period may be removed from the set of known threads 840. Additionally or alternatively, when a count of the set of known threads 840 exceeds a threshold value, a thread associated with a least recent event (in comparison to other known threads) may be removed from the set of known threads 840.

A debugger 838 does not necessarily distinguish between carrier threads and carried threads. In an embodiment, a set of known threads 840 may include both carrier threads and carried threads, but the debugger 838 does not process the carrier threads and carried threads differently. An event notification received by the debugger 838 may include a thread ID of a carrier thread or a thread ID of a carried thread, but the debugger does not process an event notification including a thread ID for a carrier thread and an event notification including a thread ID for a carried thread differently. A command transmitted by the debugger 838 may include a thread ID of a carrier thread or a thread ID of a carried thread, but the debugger does not process a command including a thread ID for a carrier thread and a command including a thread ID for a carried thread differently. In an alternative embodiment, the debugger 838 may provide different features and/or capabilities for debugging carried threads and carrier threads.

In one or more embodiments, a system may additionally or alternatively include monitoring a performance of a target program 830. In addition to or in lieu of using a debug agent 832, a monitoring or profiling agent may be used. The monitoring agent may collect performance information associated with the target program 830. The monitoring agent may communicate with the target program 830 and/or the virtual machine 803 using an interface, which may be similar to interface 842. The monitoring may communicate with a monitoring application using another interface, which may be similar to interface 844.

5. Communicating an Event Between a Debuggee and a Debugger

Figure 9:
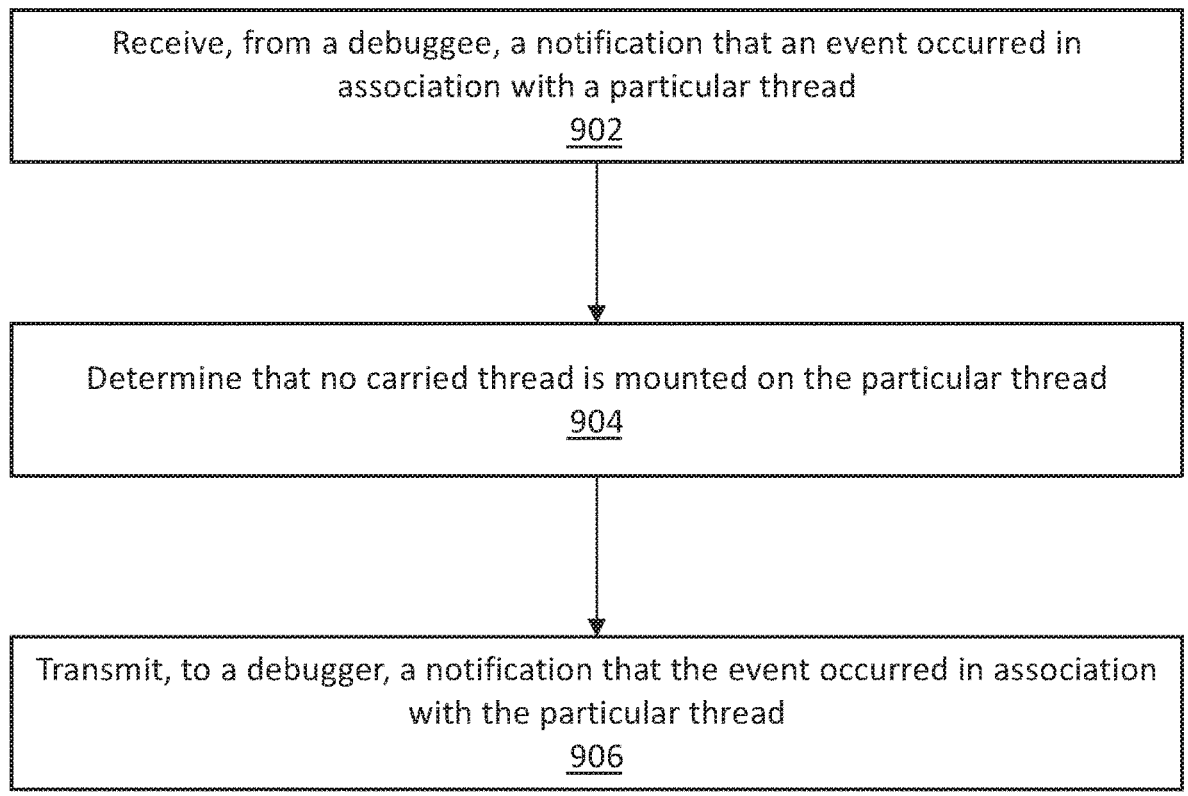
FIG. 9 illustrates an example set of operations for communicating an event associated with execution of a carrier thread according to an embodiment.

FIG. 9 illustrates an example set of operations for communicating an event associated with execution of a carrier thread according to an embodiment. One or more operations illustrated in FIG. 9 may be modified, rearranged, or omitted all together. Accordingly, the particular sequence of operations illustrated in FIG. 9 should not be construed as limiting the scope of one or more embodiments. In alternative embodiments, operations of FIG. 9 may be modified for communicating performance information associated with a carrier thread.

In alternative embodiments, in certain situations, the agent does not necessarily perform conversion of thread identifiers, as described with reference to FIG. 9, even if a carried thread is mounted on the carrier thread. Whether thread identifier conversion is performed depends on the way in which the event notifications were requested by a debugger. As an example, a debugger may request to set a breakpoint on a specific thread, which is a carrier thread. Based on the request, the agent notifies the debugger that a breakpoint notification occurred on the carrier thread, regardless of whether a carried thread is mounted on the carrier thread. As another example, a debugger may request single stepping on a specific thread, which is a carrier thread. Based on the request, the agent notifies the debugger that a single step notification occurred on the carrier thread, regardless of whether a carried thread is mounted on the carrier thread.

One or more embodiments include receiving, from a debuggee, a notification that an event occurred in association with a particular thread (Operation 902). An agent receives from a debuggee a notification that an event occurred in association with a particular thread. In an embodiment, the notification includes a reference to a thread object representing the particular thread.

As an example, an agent may receive a breakpoint notification including a reference to a thread object. The breakpoint notification indicates that a thread represented by the thread object has hit a breakpoint during execution of instructions associated with the thread.

As another example, an agent may receive a single step notification including a reference to a thread object. The single step notification indicates that a thread represented by the thread object has completed a single step of instructions associated with the thread. In the above example, single step notifications may have been enabled in response to a user's request for a single step of a bytecode and/or a single step of a source line. The single step notification is transmitted from the debuggee to the agent based on the single step notifications enablement.

One or more embodiments include determining that no carried thread is mounted on the particular thread (Operation 904). The agent determines whether any carried thread is mounted on the particular thread. In an embodiment, the agent inputs the particular thread into a function that checks whether any carried thread is mounted on the particular thread. The function inspects a thread object corresponding to the particular thread. The function determines whether the thread object includes any reference to a carried thread mounted on the particular thread. If a carried thread is mounted on the particular thread, the function returns a thread object representing the carried thread. If no carried thread is mounted on the particular thread, the function returns NULL.

One or more embodiments include transmitting, to a debugger, a notification that the event occurred in association with the particular thread (Operation 906). The agent transmits to a debugger a notification that the event occurred in association with the particular thread. In an embodiment, the agent retrieves a set of thread object-identifier mappings. Based on the set of thread object-identifier mappings, the agent maps the reference to the thread object (indicated in the notification received at Operation 902) to a thread ID of the particular thread. The notification transmitted to the debugger includes the thread ID of the particular thread. The notification thereby indicates that the event occurred in association with the particular thread.

Responsive to receiving the notification that the event occurred in association with the particular thread, the debugger may present information on a user interface indicating that the event occurred in association with the particular thread.

In an embodiment, the agent first determines whether a criteria for transmitting an event notification to the debugger has been satisfied before transmitting the event notification to the debugger.

As an example, a user may request, via a debugger, a "step over" of a bytecode or source line. The bytecode or source line may represent a method call. The debug agent may receive an event notification from the debuggee for every bytecode that is executed within the called method. However, the debug agent does not transmit every event notification. The debug agent waits until the called method is returned from before transmitting a single step notification to the debugger.

As another example, a user may request, via a debugger, a "step into" of a source line. The user may additionally add a filter of classes to be excluded from single stepping. The filter may include library classes, such that single stepping occurs only in the user's application code. During execution of the source line, the debug agent may receive an event notification from the debuggee for every bytecode that is executed. However, if a library method is called, the debug agent does not transmit a single step notification to the debugger until the library method call returns, or the library method executes a callback into user code.

The operations of FIG. 9 occur when no carried thread is involved. Since no carried thread is involved, there is no need for any thread ID conversions in the above example set of operations.

Figure 10:
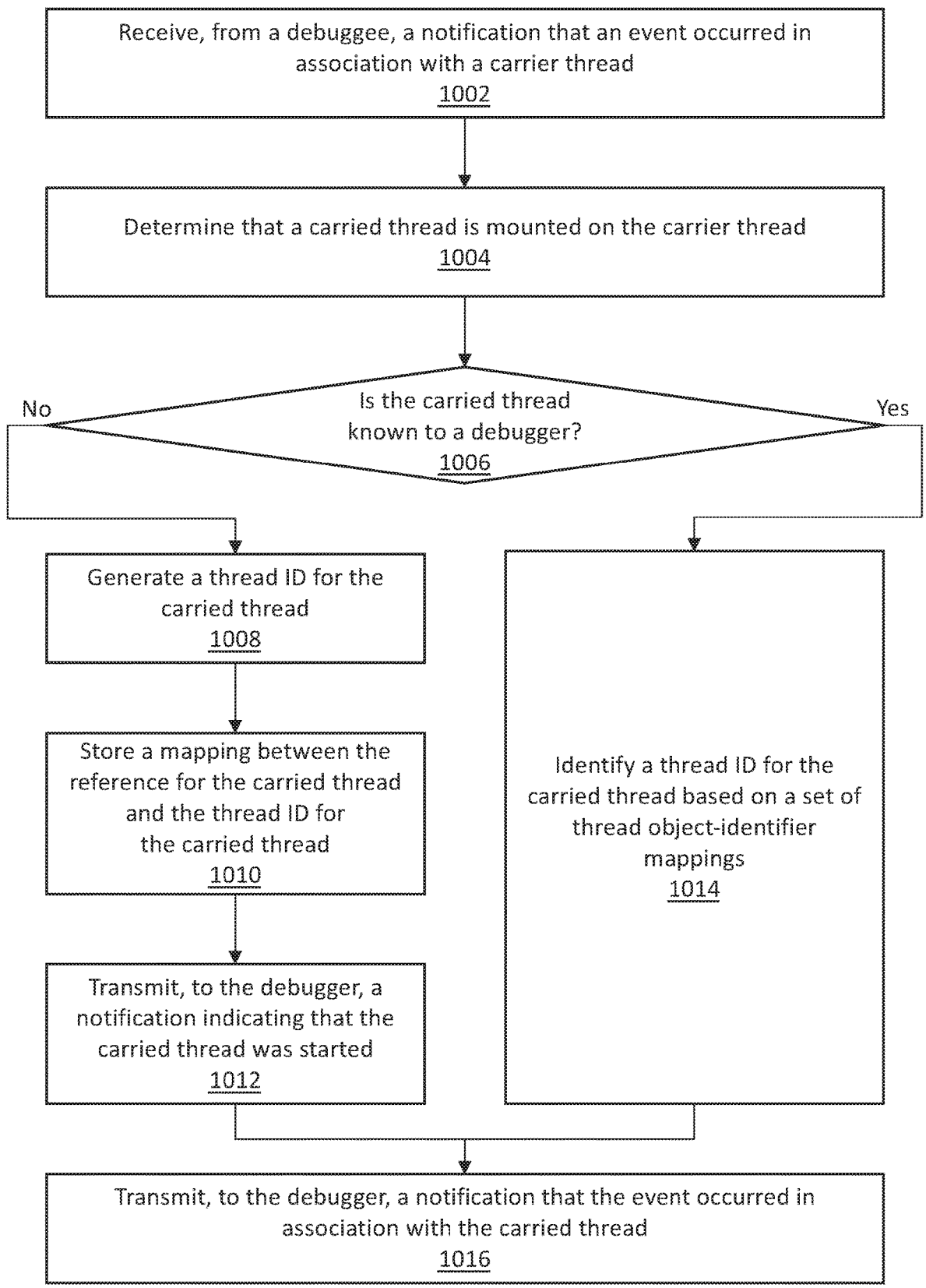
FIG. 10 illustrates an example set of operations for communicating an event associated with execution of a carried thread according to an embodiment.

FIG. 10 illustrates an example set of operations for communicating an event associated with execution of a carried thread according to an embodiment. One or more operations illustrated in FIG. 10 may be modified, rearranged, or omitted all together. Accordingly, the particular sequence of operations illustrated in FIG. 10 should not be construed as limiting the scope of one or more embodiments.

In alternative embodiments, operations of FIG. 10 may be modified for communicating performance information associated with a carried thread.

One or more embodiments include receiving, from a debuggee, a notification that an event occurred in association with a carrier thread (Operation 1002). Examples of operations for receiving a notification that an event occurred in association with a particular thread are described above with reference to Operation 902. The notification does not necessarily indicate whether the event occurred on a carrier thread or a carried thread. The notification does not necessarily identify any carried thread mounted on the carrier thread.

One or more embodiments include determining that a carried thread is mounted on the carrier thread (Operation 1004). Examples of operations for determining whether a carried thread is mounted on another thread are described above with reference to Operation 904. The agent determines that a carried thread is mounted on the carrier thread. The agent obtains a reference to a thread object representing the carried thread.

One or more embodiments include determining whether the carried thread is known to a debugger (Operation 1006).

In an embodiment, whether the carried thread is known to the debugger is determined based on a set of thread object-identifier mappings. The agent retrieves the set of thread object-identifier mappings from a data repository associated with the agent. Based on the set of thread object-identifier mappings, the agent determines whether a thread ID has been generated and mapped to the reference to the thread object representing the carried thread. If no thread ID has been generated for the carried thread, then the carried thread was not previously identified to the debugger and is not known to the debugger. Conversely, if a thread ID has been generated for the carried thread, then the carried thread was previously identified to the debugger and is known to the debugger.

In another embodiment, whether the carried thread is known to the debugger is determined further based on a query to the debugger. Based on the set of thread object-identifier mappings, the agent may determine that a thread ID has been mapped to the reference to the thread object representing the carried thread. Rather than immediately concluding that the carried thread is known to the debugger based on the thread ID for the carried thread, the agent queries the debugger to determine whether the carried thread is known to the debugger. The query includes the thread ID for the carried thread. The debugger may retrieve a set of known threads stored in a data repository associated with the debugger. The debugger searches for the queried thread in the set of known threads. If the queried thread is found in the set of known threads, then the carried thread is known to the debugger. Conversely, if the queried thread is not found in the set of known threads, then the carried thread is not known to the debugger.

If the carried thread is not known to the debugger, one or more embodiments include generating a thread ID for the carried thread (Operation 1008). The agent generates a thread ID for the carried thread. The agent may generate the thread ID in various ways. As an example, an agent may generate a thread ID for a carried thread using a random number generator. As another example, an agent may generate a thread ID for a carried thread by incrementing the last thread ID that was generated. As another example, a thread ID may have been previously mapped to a carried thread, but a debugger may indicate that the carried thread is unknown to the debugger. An agent may reuse the same thread ID for the carried thread.

One or more embodiments include storing a mapping between the reference for the carried thread and the thread ID for the carried thread (Operation 1010). The agent stores, into the set of thread object-identifier mappings, a mapping between (a) the reference to the thread object representing the carried thread and (b) the thread ID for the carried thread generated at Operation 1010.

One or more embodiments include transmitting, to the debugger, a notification indicating that the carried thread was started (Operation 1012). The agent transmits to the debugger a notification indicating the existence of the carried thread. The notification may indicate that the carried thread was constructed, initiated, and/or started. The notification includes the thread ID for the carried thread.

In an embodiment, the agent transmits (to the debugger) a notification that the carried thread was started responsive to receiving (from the debuggee) a notification that an event occurred in association with the carrier thread at Operation 1002. Merely detecting a start of a carried thread, without receiving any event notifications associated with the carried thread, does not trigger the agent to transmit the notification indicating that the carried thread was started. Hence, the agent transmits a notification that a carried thread started only if an event occurred on the carried thread. The agent does not necessarily inform the debugger of every carried thread that is started.

Responsive to receiving the notification indicating the existence of the carried thread, the debugger stores the thread ID for the carried thread into a set of known threads. Since the carried thread is now known to the debugger, the debugger is able to process events associated with the carried thread.

Returning to Operation 1006, if the carried thread is known to the debugger, one or more embodiments include identifying a thread ID for the carried thread based on a set of thread object-identifier mappings (Operation 1014). The agent retrieves the set of thread object-identifier mappings. Based on the set of thread object-identifier mappings, the agent determines a thread ID mapped to the reference to the thread object representing the carried thread.

As described above with reference to Operations 1006-1014, the agent makes the debugger aware of a carried thread, only if an event notification associated with the carried thread is received. In alternative embodiments, the agent makes the debugger aware of a carried thread after the carried thread is started, without waiting for any event notifications associated with the carried thread. Hence, the debugger is aware of substantially all carried threads executing in the debuggee.

Subsequent to Operation 1012 or Operation 1014, one or more embodiments include transmitting, to the debugger, a notification that the event occurred in association with the carried thread (Operation 1016). The agent transmits to the debugger a notification that the event occurred in association with the carried thread. In an embodiment, the notification includes the thread ID for the carried thread that was generated at Operation 1008, or the thread ID for the carried thread that was identified at Operation 1014. The notification does not necessarily include any identification of the carrier thread.

Responsive to receiving the notification that the event occurred in association with the carried thread, the debugger may present information on a user interface indicating that the event has occurred on the carried thread.

In an embodiment, the agent first determines whether a criteria for transmitting an event notification to the debugger has been satisfied before transmitting the event notification to the debugger. Examples of operations for determining whether to transmit an event notification to the debugger are described above with reference to Operation 906.

6. Communicating a Command Between a Debuggee and a Debugger

Figure 11A:
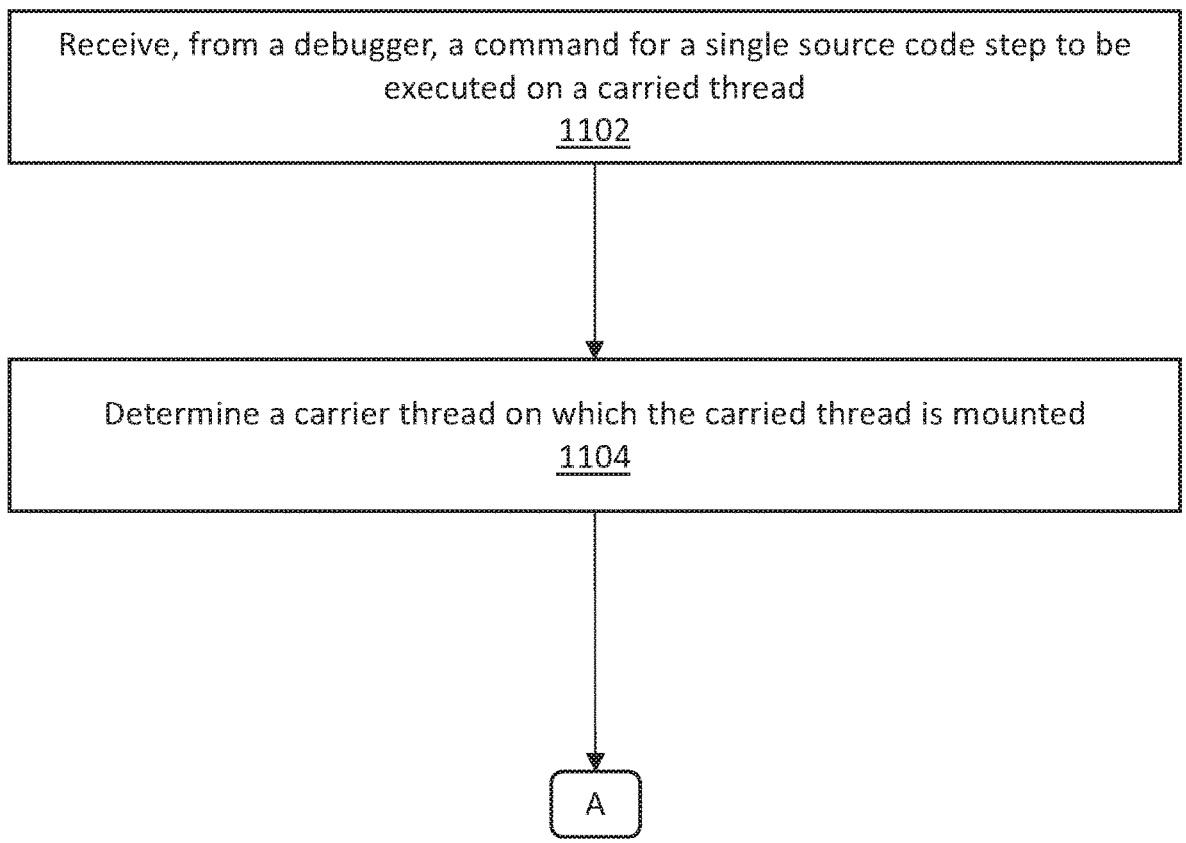
FIGS. 11A-C illustrate an example set of operations for communicating a command associated with execution of a carried thread according to an embodiment.
Figure 11B:
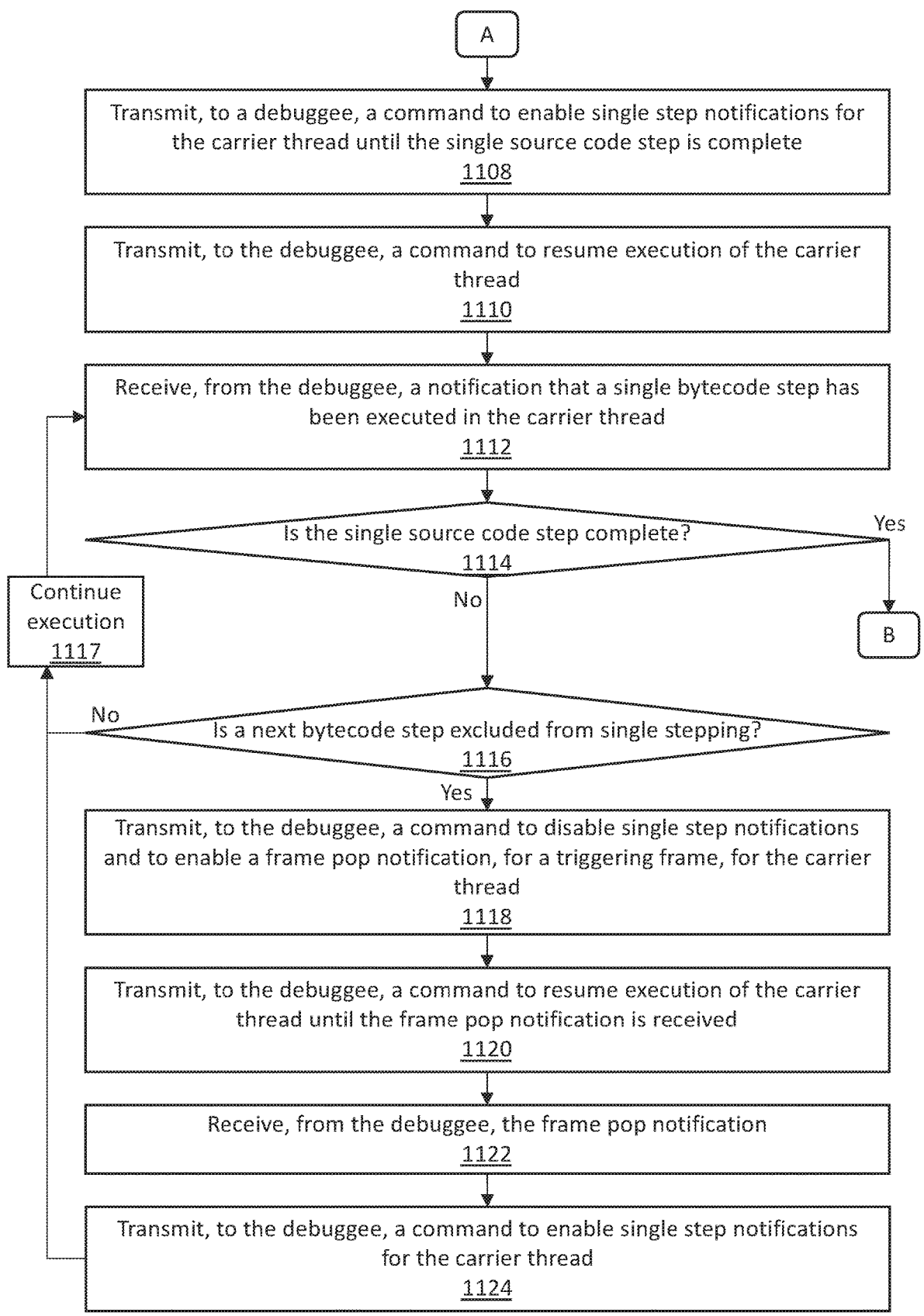
Figure 11C:
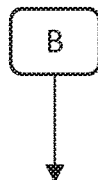

FIGS. 11A-C illustrate an example set of operations for communicating a command associated with execution of a carried thread according to an embodiment. One or more operations illustrated in FIGS. 11A-C may be modified, rearranged, or omitted all together. Accordingly, the particular sequence of operations illustrated in FIGS. 11A-C should not be construed as limiting the scope of one or more embodiments.

One or more embodiments include receiving, from a debugger, a command for a single source code step to be executed on a carried thread (Operation 1102). A debugger receives as user input a command for a single source code step to be executed on a particular thread. The debugger is not necessarily aware that the particular thread is a carried thread. An agent receives the command from the debugger. The command as communicated to the agent includes a thread ID for the carried thread. The command does not necessarily include any identification of a carrier thread on which the carried thread is mounted.

The command for the single source code step to be executed is a command for a single step of source code, associated with the particular thread, to be executed. However, an agent communicates with a debuggee with reference to virtual machine instructions (also referred to as "bytecode"), not source code. Since a line of source code may be compiled into one or more lines of virtual machine instructions, the command for the single source code step is a command for the agent to enable single step notifications (for single bytecode steps) until a set of virtual machine instructions corresponding to the single step of source code has been executed. Based on the enablement of single step notifications, a single step notification is generated for the execution of each single bytecode step. Responsive to receiving a single step notification, the agent determines whether the last single-stepped virtual machine instruction is the last virtual machine instruction corresponding to the single step of source code. If not, then single step notifications remain enabled, and another single bytecode step is executed. Conversely, if the last single-stepped virtual machine instruction is the last virtual machine instruction corresponding to the single step of source code, then single step notifications may be disabled. The agent may notify the debugger that the single step of the source code is complete.

One or more embodiments include determining a carrier thread on which the carried thread is mounted (Operation 1104). The agent determines whether the particular thread (indicated in the command received at Operation 1102) is a carried thread; if yes, the agent determines a carrier thread on which the carried thread is mounted.

In an embodiment, the agent retrieves a set of thread object-identifier mappings from a data repository associated with the agent. Based on the set of thread object-identifier mappings, the agent determines a reference to a thread object that is mapped to the thread ID for the particular thread indicated in the command received at Operation 1102.

In an embodiment, the agent inputs the reference to the thread object into a function that checks whether the thread object represents a carried thread. The function inspects the thread object to determine a type and/or class of the thread object. If the function determines that a type and/or class of the thread object corresponds to a carried thread, then the function returns TRUE. If the function determines that a type and/or class of the thread object does not correspond to a carried thread, then the function returns FALSE. In another embodiment, the agent inputs the reference to the thread object into a function that checks whether the thread object represents a carried thread. The function inspects content of the thread object to determine whether the thread object is a carrier thread or a carried thread. If the thread object is a carried thread, then the function returns TRUE. If the thread object is not a carried thread, then the function returns FALSE.

If the function returns TRUE, then the agent inputs the reference to the thread object representing the carried thread into a function that returns a reference to a thread object representing a carrier thread on which the carried thread is mounted. The function inspects the thread object representing the carried thread. The function determines whether the thread object includes any reference to a carrier thread on which the carried thread is mounted. If the carried thread is mounted on a carrier thread, the function returns a thread object representing the carrier thread. If the carried thread is not mounted, the function returns NULL.

One or more embodiments include transmitting, to a debuggee, a command to enable single step notifications for the carrier thread until the single source code step is complete (Operation 1108). The agent transmits to a debuggee a command to enable single step notifications for the carrier thread until the single source code step is complete. The command includes the reference to the thread object representing the carrier thread, as determined at Operation 1104. The command does not necessarily include any identification of the carried thread. The command in effect sets an active debug configuration for the carrier thread.

Responsive to receiving the command, the debuggee enables single step notifications on the carrier thread.

One or more embodiments include transmitting, to the debuggee, a command to resume execution of the carrier thread (Operation 1110). The agent transmits to the debuggee a command to resume execution of the carrier thread. The command includes the reference to the thread object representing the carrier thread, as determined at Operation 1104. The command does not necessarily include any identification of the carried thread.

Responsive to receiving the command, the debuggee executes a single bytecode step in the carrier thread. Since the carried thread is mounted on the carrier thread, any instruction executed on the carrier thread is an instruction associated with the carried thread. Hence the single bytecode step in the carrier thread is a single bytecode step in the carried thread.

One or more embodiments include receiving, from the debuggee, a notification that a single bytecode step has been executed in the carrier thread (Operation 1112). Based on the enablement of single step notifications on the carrier thread, the agent receives from the debuggee a notification that the single bytecode step has been executed in the carrier thread. The notification includes the reference to the thread object representing the carrier thread, as determined at Operation 1104. The notification does not necessarily include any identification of the carried thread.

Responsive to receiving the notification that the single bytecode step has been executed, one or more embodiments include determining whether the single source code step is complete (Operation 1114). The agent determines whether the last single-stepped virtual machine instruction is the last virtual machine instruction corresponding to the single source code step. If the last single-stepped virtual machine instruction is the last virtual machine instruction corresponding to the single source code step, then the single source code step is complete.

If the single source code step is not complete, then one or more embodiments include determining whether a next bytecode step to be executed is excluded from single stepping (Operation 1116). The agent retrieves a set of code libraries that are excluded from single stepping. If the next bytecode step is associated with an excluded code library, then the next bytecode step is excluded from single stepping.

As an example, standard libraries as described in the Application Programming Interface (API) Specification of the Java Platform may be excluded from single stepping. Such libraries include, for example, java.io, java.lang, and java.util. A debugger may request exclusion of standard libraries from single stepping by adding a filter to a request for single step notifications enablement. The filter may serve to filter out the excluded standard libraries from single stepping.

As another example, a debugger may request a "step over" of a method call. Upon executing the first bytecode of the method, the agent determines that the bytecode is excluded from single stepping.

If the next bytecode step is not excluded from single stepping, then one or more embodiments include continuing execution of the carrier thread (Operation 1117). Then Operations 1112-1117 are iterated, until the single source code step is complete. Since single step notifications remain enabled, the agent receives a notification that the next single bytecode step has been executed. Responsive to receiving the single step notification, the agent performs a check to determine whether the single source code step is complete. Hence, a single step notification is generated for each single bytecode step until the single source code step is complete.

During the iteration process, if a bytecode step is excluded from single stepping, then one or more embodiments include transmitting, to the debuggee, a command to disable single step notifications and to enable a frame pop notification, for a triggering frame, for the carrier thread (Operation 1118). The agent transmits to the debuggee a command to disable single step notifications, for the carrier thread, until a frame pop notification is received. Additionally, the agent transmits to the debuggee a command to enable a frame pop notification for a triggering frame. The agent transmits to the debuggee the command to enable the frame pop notification for the carrier thread. The one or more commands include the reference to the thread object representing the carrier thread, as determined at Operation 1104. The commands do not necessarily include any identification of the carried thread. The commands in effect set active debug configurations for the carrier thread.

The command to enable the frame pop notification designates the triggering frame as the current frame on the thread stack, which is the first frame corresponding to code that is excluded from single stepping. Based on the enablement of the frame pop notification, the frame pop notification would be generated when the triggering frame is popped from the call stack of the carrier thread.

One or more embodiments include transmitting, to the debuggee, a command to resume execution of the carrier thread until the frame pop notification is received (Operation 1120). The agent transmits to the debuggee a command to resume execution of the carrier thread until the frame pop notification is received. The command includes the reference to the thread object representing the carrier thread, as determined at Operation 1104. The command does not necessarily include any identification of the carried thread.

Responsive to the command to resume execution of the carrier thread, the debuggee executes the carrier thread. Since the carried thread is mounted on the carrier thread, executing the carrier thread is executing the carried thread.

Execution of the carrier thread (and therefore execution of the carried thread) continues until the frame pop notification is received. Executing the carrier thread may include calling additional methods. Calling additional methods results in additional frames pushed onto the call stack of the carrier thread. Pushing additional frames onto the call stack does not cause a frame pop notification to be generated. As execution of the methods is completed, frames corresponding to the methods are popped. Finally, the triggering frame is popped.

One or more embodiments include receiving, from the debuggee, the frame pop notification (Operation 1122). When the triggering frame is popped, the debuggee generates the frame pop notification for the triggering frame. The frame pop notification for the triggering frame is disabled and/or removed once the frame pop notification for the triggering frame is generated. The agent receives the frame pop notification for the triggering frame from the debuggee.

Responsive to receiving the frame pop notification, one or more embodiments include transmitting, to the debuggee, a command to enable single step notifications for the carrier thread (Operation 1124). The agent transmits, to the debuggee, a command to enable single step notifications for the carrier thread. The command includes the reference to the thread object representing the carrier thread, as determined at Operation 1104. The command does not necessarily include any identification of the carried thread. The command in effect sets active debug configurations for the carrier thread.

One or more embodiments including resuming execution of the carrier thread (Operation 1117). At least some of Operations 1112-1124 are iterated, until the single source code step is complete. The agent determines whether the single source code step is complete. If the single source code step is not complete, the agent determines whether a next bytecode step is excluded from single stepping. If the next bytecode step is not excluded from single stepping, the agent transmits commands to enable single step notifications and to execute the next bytecode step on the carrier thread. If the next bytecode step is excluded from single stepping, the agent transmits a command to enable a frame pop notification for another triggering frame. The agent transmits a command to resume execution until the frame pop notification is received. The agent continues the process until the single source code step is complete. Finally, the agent determines that the single source code step is complete at Operation 1114.

One or more embodiments include disabling notifications that were enabled for the carrier thread based on the command for the single source code step to be executed on the carried thread (Operation 1126). The agent identifies any event notifications that are currently enabled for the carrier thread based on the command for the single source code step received at Operation 1102. The agent transmits a command to the debuggee to disable the identified notifications. The command includes the reference to the thread object representing the carrier thread, as determined at Operation 1104. The command does not necessarily include any identification of the carried thread. The command in effect sets one or more active debug configurations for the carrier thread.

As an example, single step notifications may be enabled on a carrier thread based on a command for a single source code step to be executed on a carried thread. After determining that the requested single source code step is complete, an agent may disable the single step notifications on the carrier thread.

Figure 12A:
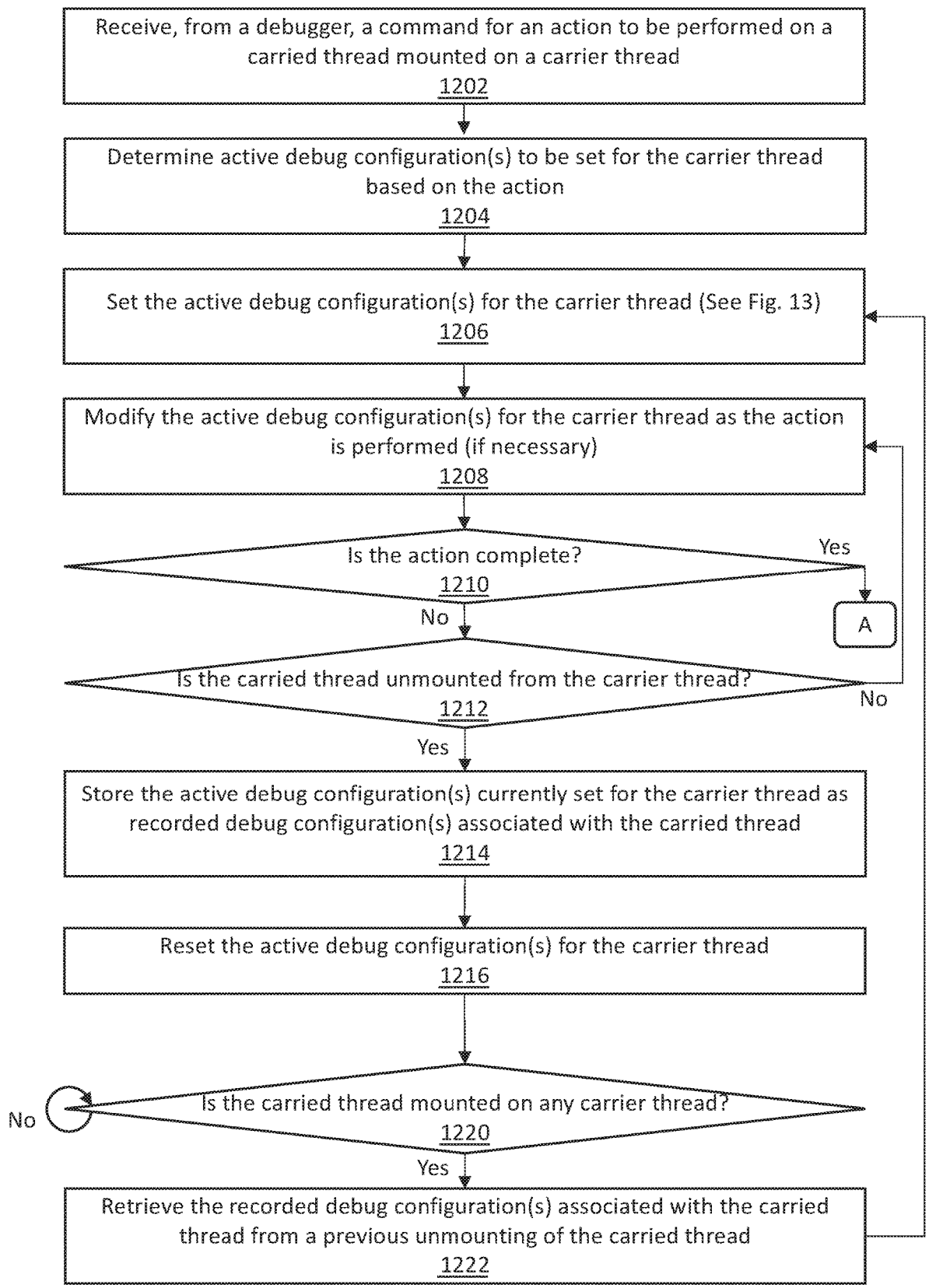
FIGS. 12A-B illustrate an example set of operations for transferring a debug configuration during mounting and unmounting of a carried thread according to an embodiment.
Figure 12B:
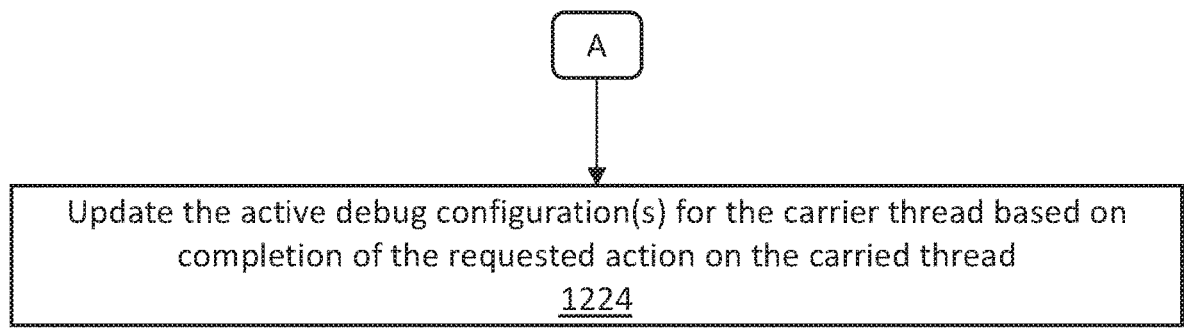

7. Setting and Transferring a Debug Configuration Associated with a Carried Thread FIGS. 12A-B illustrate an example set of operations for transferring a debug configuration during mounting and unmounting of a carried thread according to an embodiment. One or more operations illustrated in FIG. 12A-B may be modified, rearranged, or omitted all together. Accordingly, the particular sequence of operations illustrated in FIGS. 12A-B should not be construed as limiting the scope of one or more embodiments.

One or more embodiments include receiving, from a debugger, a command for an action to be performed on a carried thread (Operation 1202). A debugger receives as user input a command for an action to be performed on a particular thread. As an example, a command for an action to be performed on a carried thread requests enablement of single step notifications on the virtual machine instructions associated with the carried thread until a single source code step is complete. The debugger is not necessarily aware that the particular thread is a carried thread.

An agent receives the command from the debugger. The command as communicated to the agent includes a thread ID for the carried thread. The command does not necessarily include any identification of a carrier thread on which the carried thread is mounted.

The agent determines whether the particular thread is a carried thread. Responsive to determining that the particular thread is a carried thread, the agent determines a carrier thread on which the carried thread is mounted. The agent obtains a reference to a thread object representing the carrier thread. Examples of operations for determining a carrier thread on which a carried thread is mounted are described with reference to Operation 1104.

One or more embodiments include determining one or more active debug configurations to be set for the carrier thread based on the action (Operation 1204). The agent determines active debug configurations associated with the requested action. The agent identifies the active debug configurations for configuring the carrier thread. As an example, a command for an action to be performed on a carried thread requests enablement of single step notifications on the virtual machine instructions associated with a carried thread until a single source code step is complete. An agent may determine that the command is associated with an active debug configuration for enabling single step notifications. The agent may determine that single step notifications are to be enabled for the carrier thread.

One or more embodiments include setting the active debug configurations for the carrier thread (Operation 1206). The agent sets the active debug configurations for the carrier thread. The agent transmits to a debuggee a command for setting the active debug configurations for the carrier thread. The command includes the reference to the thread object representing the carrier thread, as determined at Operation 1202. The command does not necessarily include any identification of the carried thread.

One or more embodiments optionally include modifying debug configurations for the carrier thread as the action is performed (Operation 1208). The agent modifies debug configurations for the carrier thread as the action is performed if necessary. FIG. 11 illustrates an example where modification of debug configurations is necessary. At Operation 1102, a command for a single source code step to be executed is received. At Operation 1108, an agent sets an active debug configuration that enables single step notifications. However, during the course of single stepping virtual machine instructions, a virtual machine instruction that is excluded from single stepping is identified at Operation 1116. Then the agent modifies the active debug configurations to disable single step notifications and enable a frame pop notification at Operation 1118. Hence, the agent modifies active debug configurations as the action of single stepping a line of source code is performed.

As an example, a debugger may request a "step over" of a bytecode or source line. An agent may set an active debug configuration that enables single step notifications. However, the bytecode or source line may represent a method call. Then the agent may modify the active debug configurations to disable single step notifications and to enable a frame pop notification. The triggering frame is the frame corresponding to the method call. Hence, the agent modifies active debug configurations as the action of single stepping is performed.

One or more embodiments include determining whether the action is complete (Operation 1210). The agent determines whether the action requested at Operation 1202 is complete. As an example, a command for an action to be performed on a carried thread requests enablement of single step notifications on the virtual machine instructions associated with a carried thread until a single source code step is complete. An agent may determine whether the last single-stepped virtual machine instruction is the last virtual machine instruction corresponding to the single source code step. If the last single-stepped virtual machine instruction is the last virtual machine instruction corresponding to the single source code step, then the agent may determine that the single source code step is complete.

One or more embodiments include determining whether the carried thread is unmounted from the carrier thread (Operation 1212). The agent determines whether the carried thread is unmounted from the carrier thread. In an embodiment, when the carried thread is unmounted, the debuggee transmits to the agent a notification indicating that the carried thread is unmounted. In another embodiment, the agent inputs the reference to the thread object representing the carried thread into a function that returns a reference to a thread object representing a carrier thread on which the carried thread is mounted. If the function returns NULL, then the agent determines that the carried thread is unmounted.

If the carried thread is not unmounted, then the agent iterates Operations 1208-1212. The agent makes modifications to the active debug configurations as necessary, until the requested action is complete.

If the carried thread is unmounted, then one or more embodiments include storing one or more active debug configurations currently set for the carrier thread as recorded debug configurations associated with the carried thread (Operation 1214). The agent determines the active debug configurations currently set for the carrier thread based on the requested action.

As an example, a command for an action to be performed on a carried thread requests enablement of single step notifications on the virtual machine instructions associated with a carried thread until a single source code step is complete. Based on the requested action, single step notifications may be enabled on a carrier thread. An agent may determine that active debug configurations currently set for the carrier thread based on the requested action include enablement of single step notifications.

As another example, a command for an action to be performed on a carried thread requests enablement of single step notifications on the virtual machine instructions associated with a carried thread until a single source code step is complete. An agent may determine that frame pop notifications were enabled on a carrier thread based on the requested action. In particular, the frame pop notifications were enabled because, during the course of performing the requested action, code excluded from single stepping was identified. The agent may determine that active debug configurations currently set for the carrier thread based on the requested action include (a) disablement of single step notifications and (b) enablement of frame pop notifications.

The agent stores the active debug configurations as recorded debug configurations associated with the carried thread. As an example, a mapping and/or other type of association may be created between the recorded debug configurations and the thread ID of the carried thread. The agent stores the recorded debug configurations on a data repository associated with the agent. The agent stores the recorded debug configurations such that the recorded debug configurations may be subsequently retrieved and restored.

One or more embodiments include resetting the active debug configurations for the carrier thread (Operation 1216). The agent determines a set of active debug configurations that were in place for the carrier thread immediately before the carried thread was mounted on the carrier thread. The agent resets the active debug configurations for the carrier thread such that the active debug configurations are now the same as the active debug configurations that were in place for the carrier thread immediately before the carried thread was mounted on the carrier thread.

As an example, a carried thread may be mounted on a carrier thread. Single step notifications may be enabled on the carrier thread based on a command for a single source code step to be executed on the carried thread. The carried thread may then be unmounted. An agent may determine that single step notifications were disabled for the carrier thread before the carried thread was mounted on the carrier thread. Responsive to determining that the carried thread is unmounted, the agent may reset the active debug configurations for the carrier thread by disabling single step notifications for the carrier thread.

As an example, a carried thread may be mounted on a carrier thread. A frame pop notification may be enabled on the carrier thread based on (a) a command for a single source code step to be executed on the carried thread and (b) execution of code that is excluded from single stepping. The enabled frame pop notification may be associated with a particular triggering frame. The carried thread may then be unmounted. An agent may determine that the frame pop notification for the triggering frame was disabled for the carrier thread before the carried thread was mounted on the carrier thread. Responsive to determining that the carried thread is unmounted, an agent may reset the active debug configurations for the carrier thread by disabling the frame pop notification for the carrier thread. Additionally or alternatively, the agent may reset the active debug configurations for the carrier thread by enabling a debug configuration that ignores or disregards the frame pop notification for the triggering frame, if one is generated for the carrier thread.

One or more embodiments include determining whether the carried thread is mounted on any carrier thread (Operation 1220). The agent determines whether the carried thread is mounted on any carrier thread. The carried thread may be re-mounted on the same carrier thread (the carrier thread identified at Operation 1202). Alternatively, the carried thread may be mounted onto a different carrier thread.

In an embodiment, when the carried thread is mounted, the debuggee transmits to the agent a notification indicating that the carried thread is mounted. The notification identifies the current carrier thread for the carried thread. In another embodiment, the agent inputs the reference to the thread object representing the carried thread into a function that returns a reference to a thread object representing the current carrier thread on which the carried thread is mounted. If the function returns a reference rather than NULL, then the agent determines that the carried thread is mounted.

If the carried thread is not mounted, then the agent iterates Operation 1220. The agent continues to wait until the carried thread is mounted. Additionally or alternatively, the agent repeatedly performs checks to determine whether the carried thread is mounted.

If the carried thread is mounted, then one or more embodiments include retrieving the recorded debug configurations associated with the carried thread from a previous unmounting of the carried thread (Operation 1222). The agent retrieves a set of recorded debug configurations. Based on the set of recorded debug configurations, the agent identifies one or more recorded debug configurations associated with the thread ID of the carried thread.

Optionally, at the time the agent retrieves the set of recorded debug configurations, the agent also deletes and/or clears the recorded debug configurations for the carried thread. There is no need to continue storing the recorded debug configurations.

One or more embodiments include iterating at least some of Operations 1206-1222, until the requested action is complete. The agent sets the recorded debug configurations (retrieved at Operation 1222) as the active debug configurations for the current carrier thread. Hence, the agent effectively transfers the active debug configurations from the previous carrier thread to the current carrier thread for the same carried thread.

The agent modifies the active debug configurations as the action continues to be performed, if necessary. The agent determines whether the requested action is complete. If the requested action is not complete, the agent determines whether the carried thread is unmounted from the carrier thread. If the carried thread is not unmounted, then the agent modifies the active debug configurations as necessary while the action is performed. The agent continues until the action is complete. If the carried thread is unmounted, then the agent stores the active debug configurations currently set for the current carrier thread as recorded debug configurations associated with the carried thread. Optionally, the agent may overwrite any previously-stored recorded debug configurations with the recorded debug configurations determined based on the active debug configurations currently set for the current carrier thread. The agent resets the active debug configurations, for the carrier thread, such that the active debug configurations are now the same as the active debug configurations that were in place for the carrier thread immediately before the carried thread was mounted on the carrier thread. After the carried thread is mounted on a carrier thread again, the agent retrieves the recorded debug configurations associated with the carried thread. The agent sets the recorded debug configurations as the active debug configurations for the current carrier thread. Finally, the agent determines that the requested action is complete at Operation 1210.

One or more embodiments include updating the active debug configuration(s) for the carrier thread based on completion of the requested action on the carried thread (Operation 1224). The agent determines any active debug configurations that were set for the carrier thread based on the requested action. The agent updates the active debug configurations based on completion of the requested action. As an example, an agent may receive a command for a single source code step to be executed on a carried thread. Based on the command, the agent may enable single step notifications on a carrier thread. After the single source code step on the carried thread is executed, the agent may determine that the single step notifications were enabled based on the requested action. The agent may then disable the single step notifications for the carrier thread.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
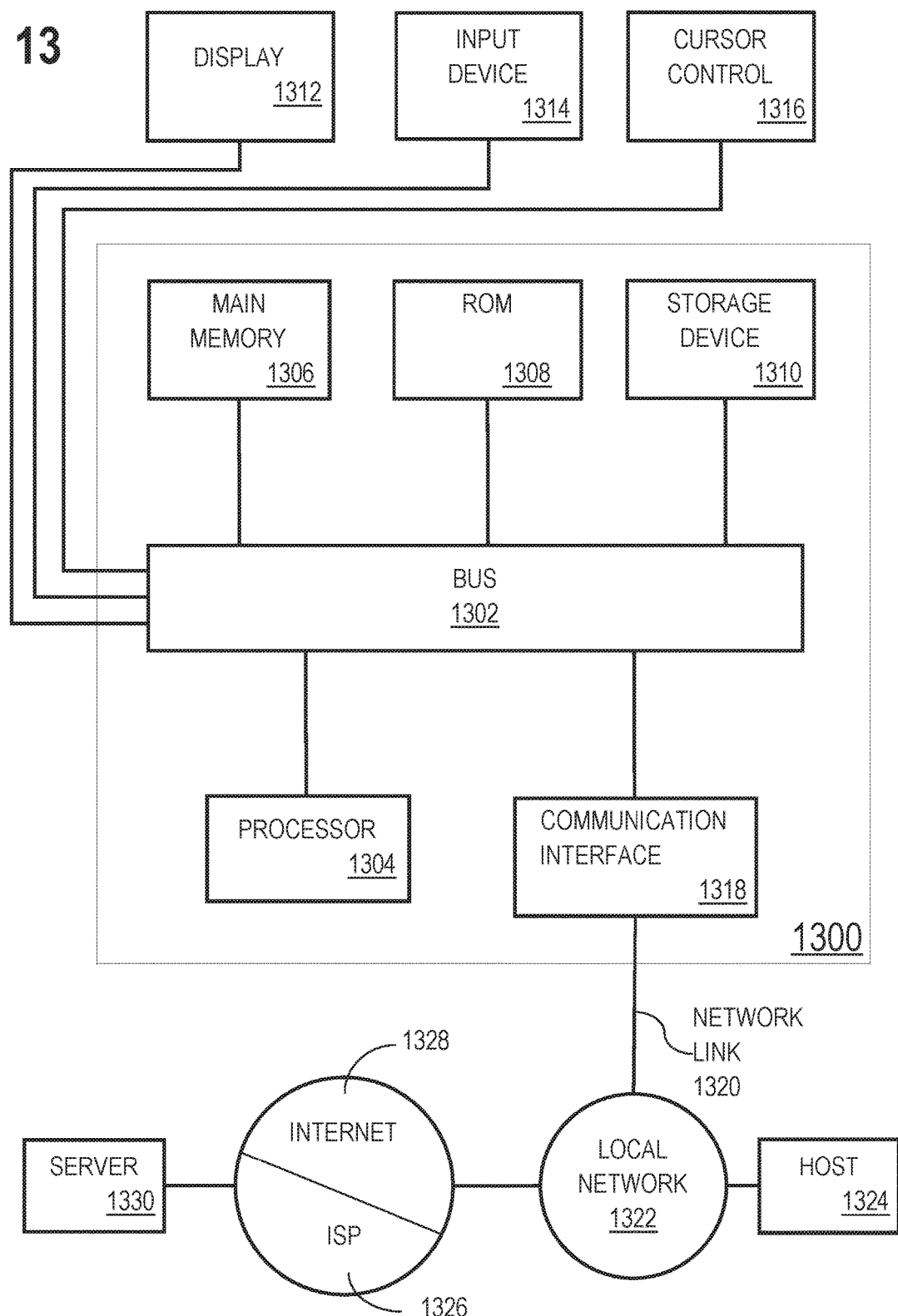
FIG. 13 illustrates a system in accordance with one or more embodiments.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   receiving, from a debuggee, a first notification that (a) indicates an event occurred in association with a first thread and (b) comprises a first identifier of the first thread;
   determining that a second thread is mounted on the first thread;
   wherein mounting the second thread on the first thread comprises linking a first frame set of the second thread to a second frame set of the first thread;
   wherein a first execution context of the first thread includes (a) the first frame set corresponding to a first set of methods called during execution of the second thread, and (b) the second frame set corresponding to a second set of methods called during execution of the first thread;
   wherein a second execution context of the second thread includes the first frame set corresponding to the first set of methods called during execution of the second thread, without including the second frame set corresponding to the second set of methods called during execution of the first thread;
   determining a second identifier corresponding to the second thread;
   transmitting, to a debugger, a second notification that (a) indicates the event occurred in association with the second thread and (b) comprises the second identifier of the second thread.

2. The one or more media of claim 1, wherein mounting the second thread on the first thread comprises pushing frames of the first frame set of the second thread onto a thread stack of the first thread.

3. The one or more media of claim 1, wherein completing execution of a first-pushed frame of the first frame set of the second thread returns to a last-pushed frame of the second frame set of the first thread.

4. The one or more media of claim 1, wherein a thread-local variable is accessible by both the first thread and the second thread.

5. The one or more media of claim 1, further storing instructions which, when executed by the one or more processors, cause:
   receiving, from the debuggee, a third notification that (a) indicates a second event occurred in association with the first thread and (b) comprises the first identifier of the first thread;
   determining that a third thread is mounted on the first thread;
   determining a third identifier corresponding to the third thread;
   transmitting, to the debugger, a fourth notification that (a) indicates the second event occurred in association with the third thread and (b) comprises the third identifier of the third thread.

6. The one or more media of claim 1, further storing instructions which, when executed by the one or more processors, cause:
   receiving, from the debuggee, a third notification that (a) indicates a second event occurred in association with the first thread and (b) comprises the first identifier of the first thread;

determining that no other threads are mounted on the first thread;
transmitting, to the debugger, a fourth notification that (a) indicates the second event occurred in association with the first thread and (b) comprises a third identifier of the first thread.

7. The one or more media of claim 1, further storing instructions which, when executed by the one or more processors, cause:
receiving, from the debugger, a first command that (a) requests an action to be performed on the second thread and (b) comprises the second identifier of the second thread;
determining that the second thread is mounted on the first thread;
transmitting, to the debuggee, a second command that (a) requests the action to be performed on the first thread and (b) comprises the first identifier of the first thread.

8. The one or more media of claim 1, wherein the first notification that the event occurred in association with the first thread indicates that the event occurred in response to execution of an instruction by the first thread, and the second notification that the event occurred in association with the second thread indicates that the event occurred in response to execution of the instruction by the second thread.

9. The one or more media of claim 1, further storing instructions which, when executed by the one or more processors, cause:
prior to transmitting, to the debugger, the second notification: transmitting, to the debugger, a third notification that (a) indicates that the second thread was started and (b) comprises the second identifier of the second thread.

10. The one or more media of claim 1, wherein mounting the second thread on the first thread comprises configuring a program counter register to link a first memory location of the first frame set of the second thread and a second memory location of the second frame set of the first thread.

11. The one or more media of claim 1, wherein determining that the second thread is mounted on the first thread comprises:
inputting the first identifier of the first thread into a function that inspects an object representing the first thread and returns whether any carried thread is mounted on the first thread.

12. The one or more media of claim 1, wherein determining that the second thread is mounted on the first thread comprises:
inputting the first identifier of the first thread into a function that inspects an object representing the first thread and returns an identifier of a carried thread mounted on the first thread.

13. The one or more media of claim 12, wherein determining the second identifier corresponding to the second thread comprises:
determining that the function returned a third identifier of the second thread;
mapping the third identifier of the second thread to the second identifier of the second thread;
wherein the third identifier is used by the debuggee to refer to the second thread, and the second identifier is used by the debugger to refer to the second thread.

14. One or more non-transitory machine-readable media storing instructions which, when executed by one or more processors, cause:
receiving, from a debugger, a first command that (a) requests an action to be performed on a first thread and (b) comprises a first identifier of the first thread;
determining that the first thread is mounted on a second thread;
wherein mounting the first thread on the second thread comprises linking a first frame set of the first thread to a second frame set of the second thread;
wherein a first execution context of the first thread includes the first frame set corresponding to a first set of methods called during execution of the first thread, without including the second frame set corresponding to a second set of methods called during execution of the second thread;
wherein a second execution context of the second thread includes (a) the first frame set corresponding to the first set of methods called during execution of the first thread, and (b) the second frame set corresponding to the second set of methods called during execution of the second thread;
determining a second identifier of the second thread;
transmitting, to a debuggee, a second command that (a) requests the action to occur in association with the second thread and (b) comprises the second identifier of the second thread.

15. The one or more media of claim 14, wherein mounting the first thread on the second thread comprises pushing frames of the first frame set of the first thread onto a thread stack of the second thread.

16. The one or more media of claim 14, wherein completing execution of a first-pushed frame of the first frame set of the first thread returns to a last-pushed frame of the second frame set of the second thread.

17. The one or more media of claim 14, wherein a thread-local variable is accessible by both the first thread and the second thread.

18. The one or more media of claim 14, further storing instructions which, when executed by the one or more processors, cause:
receiving, from the debugger, a third command that (a) requests a second action to be performed on the first thread and (b) comprises the first identifier of the first thread;
determining that the first thread is mounted on a third thread;
determining a third identifier of the third thread;
transmitting, to the debuggee, a fourth command that (a) requests the second action to occur in association with the third thread and (b) comprises the third identifier of the third thread.

19. The one or more media of claim 14, wherein the first command comprises a first request for executing a single source code step on the first thread, and the first request for executing the single source code step on the first thread is a second request for enabling single step notifications on the second thread until the single source code step is complete.

20. The one or more media of claim 14, wherein mounting the first thread on the second thread comprises configuring a program counter register to link a first memory location of the first frame set of the first thread and a second memory location of the second frame set of the second thread.

21. The one or more media of claim 14, wherein determining that the first thread is mounted on the second thread comprises:
inputting the first identifier of the first thread into a function that inspects an object representing the first thread and returns an identifier of a carrier thread on which the first thread is mounted.

22. One or more non-transitory machine-readable media storing instructions which, when executed by one or more processors, cause:
    receiving, from a debuggee, a first notification that (a) indicates an event occurred in association with a first thread and (b) comprises a first identifier of the first thread;
    determining that a second thread is mounted on the first thread;
    wherein mounting the second thread on the first thread comprises linking a first frame set of the second thread to a second frame set of the first thread;
    wherein a first execution context of the first thread includes (a) the first frame set corresponding to a first set of methods called during execution of the second thread, and (b) the second frame set corresponding to a second set of methods called during execution of the first thread;
    wherein a second execution context of the second thread includes the first frame set corresponding to the first set of methods called during execution of the second thread, without including the second frame set corresponding to the second set of methods called during execution of the first thread;
    responsive to determining that the second thread was not previously identified to a debugger:
        transmitting, to the debugger, a second notification that (a) indicates that the second thread was started and (b) comprises a second identifier of the second thread.

23. The one or more media of claim 22, further storing instructions which, when executed by the one or more processors, cause:
    transmitting, to the debugger, a third notification that (a) indicates the event occurred in association with the second thread and (b) comprises the second identifier of the second thread;
    wherein the second notification is transmitted prior to the third notification.

24. The one or more media of claim 22, wherein the debugger is required to receive the second notification that the second thread was started prior to receiving a third notification that the event occurred in association with the second thread.

25. The one or more media of claim 22, wherein:
    the debugger maintains a list of threads executing on the debuggee; and
    responsive to the second notification, the debugger adds the second thread to the list of threads.

26. The one or more media of claim 22, wherein mounting the second thread on the first thread comprises configuring a program counter register to link a first memory location of the first frame set of the second thread and a second memory location of the second frame set of the first thread.

27. The one or more media of claim 22, wherein determining that the second thread is mounted on the first thread comprises:
    inputting the first identifier of the first thread into a function that inspects an object representing the first thread and returns an identifier of a carried thread mounted on the first thread.

28. The one or more media of claim 27, further storing instructions which cause:
    further responsive to determining that the second thread was not previously identified to the debugger:
        generating the second identifier corresponding to the second thread;
        mapping a third identifier of the second thread returned from the function to the second identifier of the second thread.

29. A system, comprising:
    one or more devices, each including one or more hardware processors; and
    the system being configured to perform operations comprising:
    receiving, from a debuggee, a first notification that (a) indicates an event occurred in association with a first thread and (b) comprises a first identifier of the first thread;
    determining that a second thread is mounted on the first thread;
    wherein mounting the second thread on the first thread comprises linking a first frame set of the second thread to a second frame set of the first thread;
    wherein a first execution context of the first thread includes (a) the first frame set corresponding to a first set of methods called during execution of the second thread, and (b) the second frame set corresponding to a second set of methods called during execution of the first thread;
    wherein a second execution context of the second thread includes the first frame set corresponding to the first set of methods called during execution of the second thread, without including the second frame set corresponding to the second set of methods called during execution of the first thread;
    determining a second identifier corresponding to the second thread;
    transmitting, to a debugger, a second notification that (a) indicates the event occurred in association with the second thread and (b) comprises the second identifier of the second thread.

30. A system, comprising: one or more devices, each including one or more hardware processors; and the system being configured to perform operations comprising: receiving, from a debugger, a first command that (a) requests an action to be performed on a first thread and (b) comprises a first identifier of the first thread; determining that the first thread is mounted on a second thread; wherein mounting the first thread on the second thread comprises linking a first frame set of the first thread to a second frame set of the second thread; wherein a first execution context of the first thread includes the first frame set corresponding to a first set of methods called during execution of the first thread, without including the second frame set corresponding to a second set of methods called during execution of the second thread; wherein a second execution context of the second thread includes (a) the first frame set corresponding to the first set of methods called during execution of the first thread, and (b) the second frame set corresponding to the second set of methods called during execution of the second thread; determining a second identifier of the second thread; transmitting, to a debuggee, a second command that (a) requests the action to occur in association with the second thread and (b) comprises the second identifier of the second thread.

* * * * *